United States Patent
Khuong et al.

(10) Patent No.: US 10,346,397 B2
(45) Date of Patent: Jul. 9, 2019

(54) SYSTEM AND METHOD FOR QUERYING DATA SOURCES

(71) Applicant: CASWIL CORPORATION, Quebec (CA)

(72) Inventors: Sophal Khuong, Quebec (CA); Patrick Savoie, Levis (CA)

(73) Assignee: CASWIL CORPORATION, Quebec (CA)

( * ) Notice: Subject to any disclaimer, the term of this patent is extended or adjusted under 35 U.S.C. 154(b) by 85 days.

(21) Appl. No.: 15/561,367

(22) PCT Filed: Mar. 24, 2016

(86) PCT No.: PCT/CA2016/050351
§ 371 (c)(1),
(2) Date: Sep. 25, 2017

(87) PCT Pub. No.: WO2016/149834
PCT Pub. Date: Sep. 29, 2016

(65) Prior Publication Data
US 2018/0081938 A1 Mar. 22, 2018

Related U.S. Application Data

(60) Provisional application No. 62/138,450, filed on Mar. 26, 2015.

(51) Int. Cl.
*G06F 16/248* (2019.01)
*G06F 16/25* (2019.01)
(Continued)

(52) U.S. Cl.
CPC ...... *G06F 16/24535* (2019.01); *G06F 16/248* (2019.01); *G06F 16/24539* (2019.01);
(Continued)

(58) Field of Classification Search
CPC ... G06F 16/278; G06F 16/221; G06F 16/2365
(Continued)

(56) References Cited

U.S. PATENT DOCUMENTS 6,341,281 B1 1/2002 MacNicol et al.
6,859,798 B1 2/2005 Bedell et al.
(Continued)

FOREIGN PATENT DOCUMENTS

WO 2013190416 12/2013
WO 2014093719 6/2014

OTHER PUBLICATIONS

"SQL Tutorial", tutorialspoint Tutorials Library, online document retrieved from Internet Archive, Mar. 26, 2014 (Mar. 26, 2014), pp. D1a: "SQL-Sub Queries", [retrieved on Jun. 2, 2016 (Jun. 2, 2016)], Retrieved from: http://web.archive.org/web/20140326100859/http://www.tutorialspoint.com/sql/sql-sub-queries.htm.
(Continued)

*Primary Examiner* — Cheyne D Ly
(74) *Attorney, Agent, or Firm* — Norton Rose Fullbright Canada LLP

(57) ABSTRACT

There is described a method and system for obtaining results from one or more data sources without the need to extract, transform and load the data into a database prior to performing a query. The data may retain its original format and remain in its initial location, and selective access to the data is provided using dynamically generated query statements. Multiple data sources may be accessed concurrently, each data source having its own format for stored data. Query statements are generated to obtain data (query results) from the various data sources by defining data sources, target fields, and parameters to be used for a given query. The statements comprise predefined operations that are applied recursively in order to transform (and sometimes aggregate)
(Continued)

the data from the data sources into query results. Query statements and query results may be saved for later use.

28 Claims, 21 Drawing Sheets

(51) Int. Cl.
  *G06F 16/2453* (2019.01)
  *G06F 16/2455* (2019.01)
  *G06F 16/2457* (2019.01)
(52) U.S. Cl.
  CPC .. *G06F 16/24568* (2019.01); *G06F 16/24578* (2019.01); *G06F 16/256* (2019.01)
(58) Field of Classification Search
  USPC .......................................... 707/602, 722, 770
  See application file for complete search history.

(56) References Cited

U.S. PATENT DOCUMENTS

| | | | |
|---|---|---|---|
| 6,996,569 | B1 | 2/2006 | Bedell et al. |
| 7,003,512 | B1 | 2/2006 | Bedell et al. |
| 7,367,011 | B2 | 4/2008 | Ramsey et al. |
| 7,421,458 | B1 | 9/2008 | Taylor et al. |
| 7,430,562 | B1 | 9/2008 | Bedell et al. |
| 7,881,443 | B2 | 2/2011 | Langseth et al. |
| 7,925,616 | B2 | 4/2011 | Hurwood et al. |
| 7,941,398 | B2 | 5/2011 | Sichi et al. |
| 7,945,584 | B2 | 5/2011 | Bedell et al. |
| 8,285,642 | B2 | 10/2012 | Cesarini et al. |
| 8,321,411 | B2 | 11/2012 | Yost et al. |
| 8,352,495 | B2 | 1/2013 | LaRowe et al. |
| 8,521,733 | B1 | 8/2013 | Patekar |
| 8,583,680 | B2 | 11/2013 | Hoang |
| 8,607,138 | B2 | 12/2013 | Harold et al. |
| 8,707,336 | B2 | 4/2014 | Appelbaum et al. |
| 8,713,036 | B2 | 4/2014 | Dettinger et al. |
| 8,782,083 | B1 | 7/2014 | Cappiello et al. |
| 8,812,490 | B1 | 8/2014 | Cappiello et al. |
| 8,825,633 | B2 | 9/2014 | Weber et al. |
| 8,843,942 | B2 | 9/2014 | Arthursson et al. |
| 8,874,551 | B2 | 10/2014 | Rosjat et al. |
| 8,886,617 | B2 | 11/2014 | Grondin et al. |
| 9,183,254 | B1 | 11/2015 | Cole et al. |
| 9,507,762 | B1 * | 11/2016 | Lashley ............... G06F 16/00 |
| 2002/0010714 | A1 | 1/2002 | Hetherington |
| 2006/0015490 | A1 | 1/2006 | Denuit et al. |
| 2006/0218123 | A1 | 9/2006 | Chowdhuri et al. |
| 2010/0023921 | A1 | 1/2010 | Chaar et al. |
| 2013/0132333 | A1 | 5/2013 | De Smet et al. |
| 2013/0198166 | A1 | 8/2013 | Prout et al. |
| 2014/0244623 | A1 | 8/2014 | King |
| 2015/0095308 | A1 * | 4/2015 | Kornacker ............ G06F 16/258 707/718 |

OTHER PUBLICATIONS

"SQL Tutorial", tutorialspoint Tutorials Library, online document retrieved from Internet Archive, Mar. 26, 2014 (Mar. 26, 2014), pp. D1b: "SQL-WHERE clause", [retrieved on Jun. 2, 2016 (Jun. 2, 2016)], Retrieved from: http://web.archive.org/web/20140326094751/ http://www.tutorialspoint.com/sql/sql-where-clause.htm.

"SQL Tutorial", tutorialspoint Tutorials Library, online document retrieved from Internet Archive, Mar. 26, 2014 (Mar. 26, 2014), pp. D1c: "SQL—Using Joins", [retrieved on Jun. 2, 2016 (Jun. 2, 2016)], Retrieved from: http://web.archive.org/web/20140326093926/ http://www.tutorialspoint.com/sql/sql-using-joins.htm.

"SQL Tutorial", tutorialspoint Tutorials Library, online document retrieved from Internet Archive, Mar. 26, 2014 (Mar. 26, 2014), pp. D1d: "SQL—Group by", (retrieved on Jun. 2, 2016 (Jun. 2, 2016)], Retrieved from: http://web.archive.org/web/20140326100715/http:// www.tutorialspoint.com/sql/sql-group-by.htm.

"SQL Tutorial", tutorialspoint Tutorials Library, online document retrieved from Internet Archive, Mar. 26, 2014 (Mar. 26, 2014), 3 pages D1a: "SQL—Sub Queries", [retrieved on Jun. 2, 2016 (Jun. 2, 2016)], Retrieved from; http://web.archive.org/web/20140326100859/ http://www.tutorialspoint.com/sql/sql-sub-queries.htm].

"SQL Tutorial", tutorialspoint Tutorials Library, online document retrieved from Internet Archive, Mar. 26, 2014 (Mar. 26, 2014), 2 pages D1b: "SQL—WHERE clause", [retrieved on Jun. 2, 2016 (Jun. 2, 2016)], Retrieved from: http://web.archive.org/web/ 20140326094751/http://www.tutorialspoint.com/sql/sql-where-clause. htm].

"SQL Tutorial", tutorialspoint Tutorials Library, online document retrieved from Internet Archive, Mar. 26, 2014 (Mar. 26, 2014), 2 pages D1c: "SQL—Using Joins", [retrieved on Jun. 2, 2016 (Jun. 2, 2016)]. Retrieved from: http://web.archive.org/web/20140326093926/ http://www.tutorialspoint.com/sql/sql-using-joins.htm].

"SQL Tutorial", tutorialspoint Tutorials Library, online document retrieved from Internet Archive, Mar. 26, 2014 (Mar. 26, 2014), 2 pages D1d: "SQL—Group by", [retrieved on Jun. 2, 2016 (Jun. 2, 2016)], Retrieved from: http://web.archive.org/web/20140326100715/ http://www. tutorialspoint.com/sql/sql-group-by.htm].

* cited by examiner

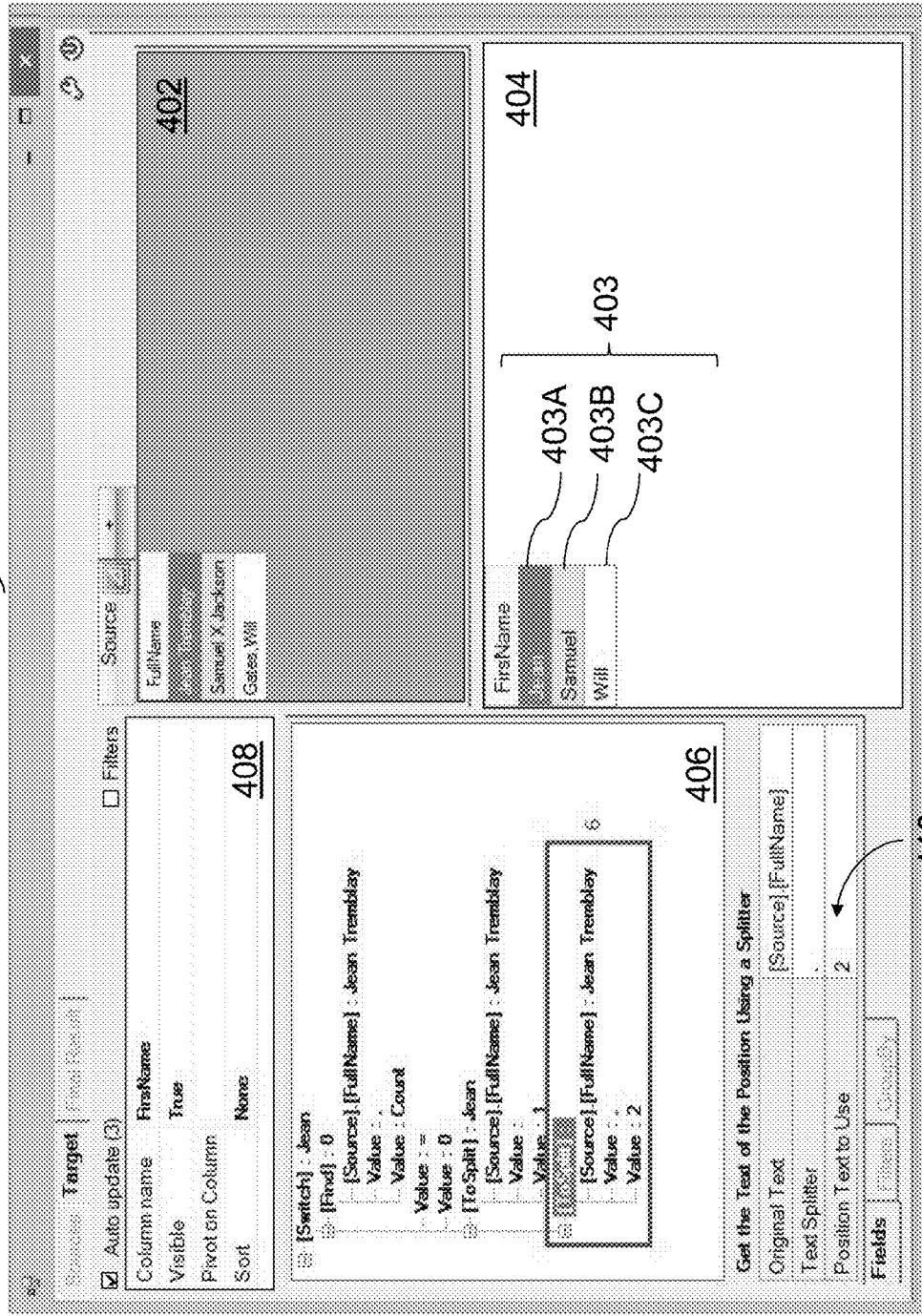

SYSTEM AND METHOD FOR QUERYING DATA SOURCES

CROSS-REFERENCE TO RELATED APPLICATIONS

The present application is a US National Stage of International Application No. PCT/CA2016/050351, filed on Mar. 24, 2016, which claims priority under 35 U.S.C. 119(e) of U.S. Provisional Patent Application bearing Ser. No. 62/138,450, filed on Mar. 26, 2015, the contents of which are hereby incorporated by reference in their entirety.

TECHNICAL FIELD

The present disclosure relates to the field of data processing and more particularly, to querying data from multiple data sources/layouts, and cleaning, transforming and aggregating the data to return a query result.

BACKGROUND OF THE ART

Databases (or data warehouses) are data repositories designed to facilitate information retrieval and analysis. Extract, transform and load (ETL) is a process that is needed to populate data in a database. Data is extracted from homogeneous or heterogeneous data sources. The extracted data is transformed into a proper format or structure and the transformed data is loaded into tables in the database for querying and analysis purposes. This approach is referred to as "schema-on-write". The process is tedious and may be complex if there are large variations in the format or structure of data extracted from the various data sources. In addition, as the number of data tables increases the tables themselves need changes, the costs associated with storing and managing the structure and the stored data also increase.

Data querying refers to making a request for information from a database. The predefined structure with proper indexation and the ability to properly target a query in order to efficiently obtain only the information requested is what makes databases so powerful. There are various forms of posing queries, such as choosing parameters from a menu, query by example (QBE), and using a query language. Use of a query language, such as Structured Query Language (SQL), requires knowledge of the database structure, business concept, and general query programming language, and therefore not everyone can design new queries on the fly. Even with query methods other than direct use of a query language, the query language is usually involved behind the scenes to generate the query.

The rigidity and the need to predefine everything in advance to store data in a database, the complexity to manage exceptions and clean everything before loading data to the database affect cost and flexibility of any data solution. Therefore, there is a need to improve methods and systems used to access data stored in data sources.

Moreover, there is a shift in the data management industry to store data using an unstructured base, use scripts to manage different structures of data, and transform and process data with the similar scripts. This approach is referred to as "schema-on-read" and is sometimes called NoSQL, Hadoop or Big Data in general. As there are no structured scripts, the complexity and dependency of managing the structures has shifted from database administrators to skilled programmers. Therefore, there is also a need to improve methods to structure and maintain that approach.

SUMMARY

There is described herein a method and system for obtaining results from one or more data sources without the need to extract, transform and load the data into a database prior to performing a query. The data may retain its original format and remain in its initial location, and selective access to the data is provided using dynamically generated query statements. Multiple data sources may be accessed concurrently, each data source having its own format for stored data. Update of queries is facilitated by the general structure and visual nature of the method.

Query statements are generated to obtain data (query results) from the various data sources by defining data sources, target fields, and parameters to be used for a given query. The statements comprise predefined operations that are applied recursively in order to transform (and sometimes aggregate) the data from the data sources into query results. Query statements and query results may be saved for later use (if applicable) along with an information file to determine the source, the parameter, and the query statement used.

Saved query results may be reused (i.e. used to regenerate a query result) if a new query comprises the same data sources and the same parameters, and the data sources have not changed. Saved query statements may also be reused if a new query comprises the same data sources and the same parameters but the data source has changed. In such a case, a previously saved query result may be deleted and a new query result may be generated along with a new information file.

Saved query statements may be used as data sources for new query statements. This creates a recursive and cascading architecture, whereby a statement may pull raw data from different sources and produce query results to be used as sources for other query results.

The system is essentially a "pull-type" system, whereby data is pulled when needed, instead of a "push-type" system, whereby data is pushed into a database for later access. The pull function is recursive in its transformation of the data from the various data sources in order to generate a result. The saved statements and saved results are used in a recursive and cascading architecture.

In accordance with a first broad aspect, there is provided a method for querying data from data sources. The method comprises receiving a first query request and generating a first query statement corresponding to the first query request, the first query statement identifying at least one first data source; at least one first target field; first query parameters; and a plurality of nested operations having associated attributes. The method further comprises executing the first query statement by accessing the at least one first data source using the first query parameters; retrieving data from a given field in the at least one first data source using at least one of the nested operations; and transforming retrieved data into at least one target result using remaining ones of the nested operations. The method also comprises generating a first query result by populating the at least one target field with the at least one target result.

In accordance with another broad aspect, there is provided a system for querying data from data sources. The system comprises a processing unit and a memory communicatively coupled to the processing unit and comprising computer-readable program instructions. The program instructions are executable by the processing unit for receiving a first query request and generating a first query statement corresponding to the first query request, the first query statement identifying at least one first data source; at least one first target field; first query parameters; and a plurality of nested operations having associated attributes. The program is also executable for executing the first query statement by accessing the at least one first data source using the first query parameters; retrieving data from a given field in the at least one first data source using at least one of the nested operations; and transforming retrieved data into at least one target result using remaining ones of the nested operations. The program code is also executable for generating a first query result by populating the at least one target field with the at least one target result.

In accordance with yet another broad aspect, there is provided a non-transitory computer readable medium having stored thereon program instructions executable by a processing unit for querying data from data sources. The program instructions are executable for receiving a first query request and generating a first query statement corresponding to the first query request, the first query statement identifying at least one first data source; at least one first target field; first query parameters; and a plurality of nested operations having associated attributes. The instructions are also for executing the first query statement by accessing the at least one first data source using the first query parameters; retrieving data from a given field in the at least one first data source using at least one of the nested operations; and transforming retrieved data into at least one target result using remaining ones of the nested operations. The instructions are also for generating a first query result by populating the at least one target field with the at least one target result.

BRIEF DESCRIPTION OF THE DRAWINGS

Further features and advantages of the present invention will become apparent from the following detailed description, taken in combination with the appended drawings, in which:

FIGS. 4a to 4f are screenshots of a graphical user interface showing an exemplary creation of a recursive transformation of data to define a target field;

FIGS. 5a to 5d are screenshots of a graphical user interface showing an exemplary creation of a recursive transformation of data to define a joined target where at least two data sources are joined together and the initial node of the target field is a join function;

It will be noted that throughout the appended drawings, like features are identified by like reference numerals.

DETAILED DESCRIPTION

Figure 1:
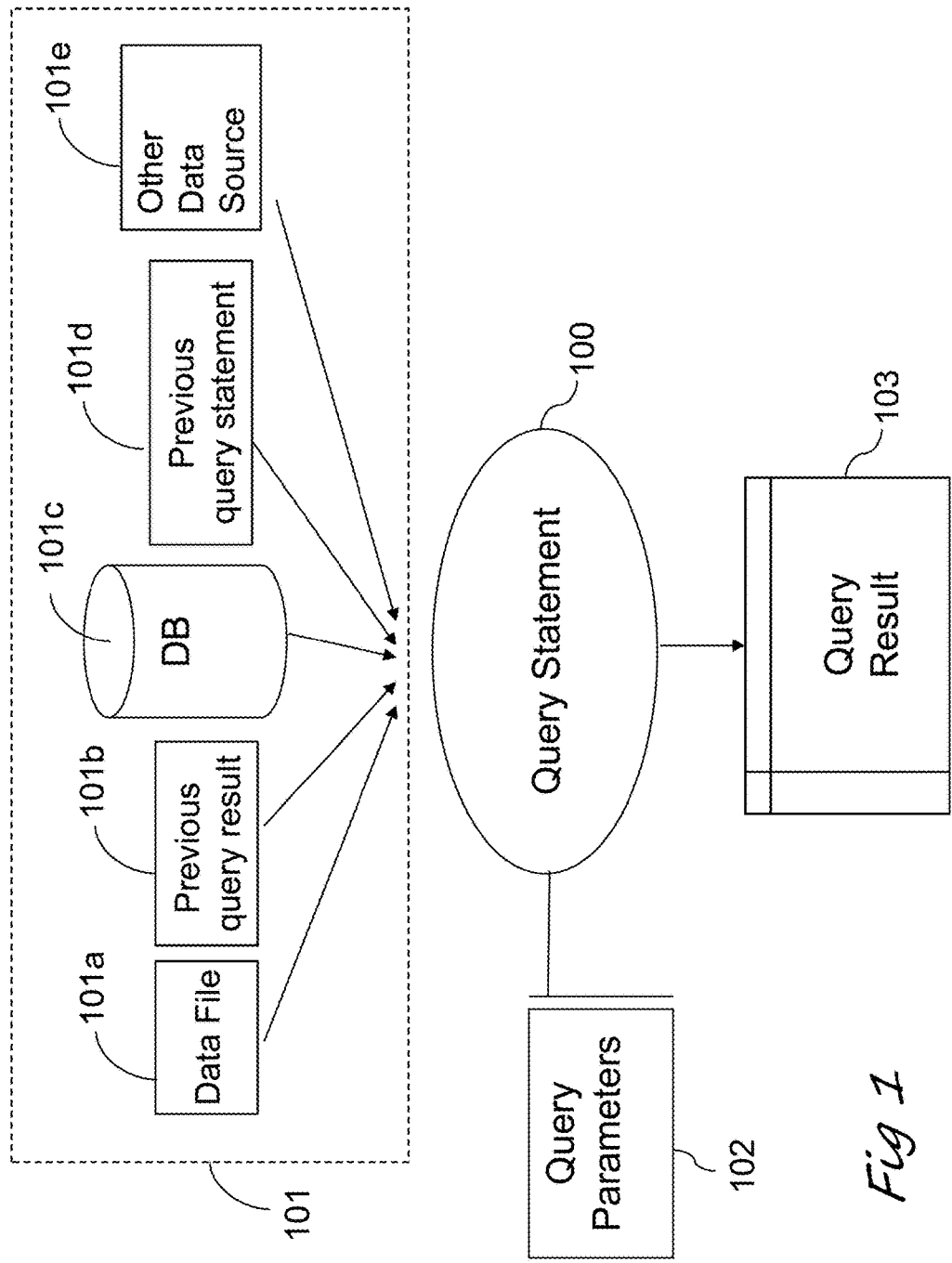
FIG. 1 illustrates some components used for a data query method.

Referring to FIG. 1, there are illustrated the basic components of a data query method. A query statement 100 comprises one or more operations that define a query request. The query statement 100 identifies at least one data source from a set of data sources 101. The data sources 101 are, for example, data files 101a, previous query results 101b, databases 101c, previous query statements 101d, or other types of data sources 101e such as data from a table on a website. The query statement 100 also defines at least one target field from at least one data source from which to extract data. The query statement 100 uses query parameters 102 that may be defined and passed on the fly to create query results 103. The query parameters 102 may also be default parameters that are global to all query statements 100.

Figure 2:
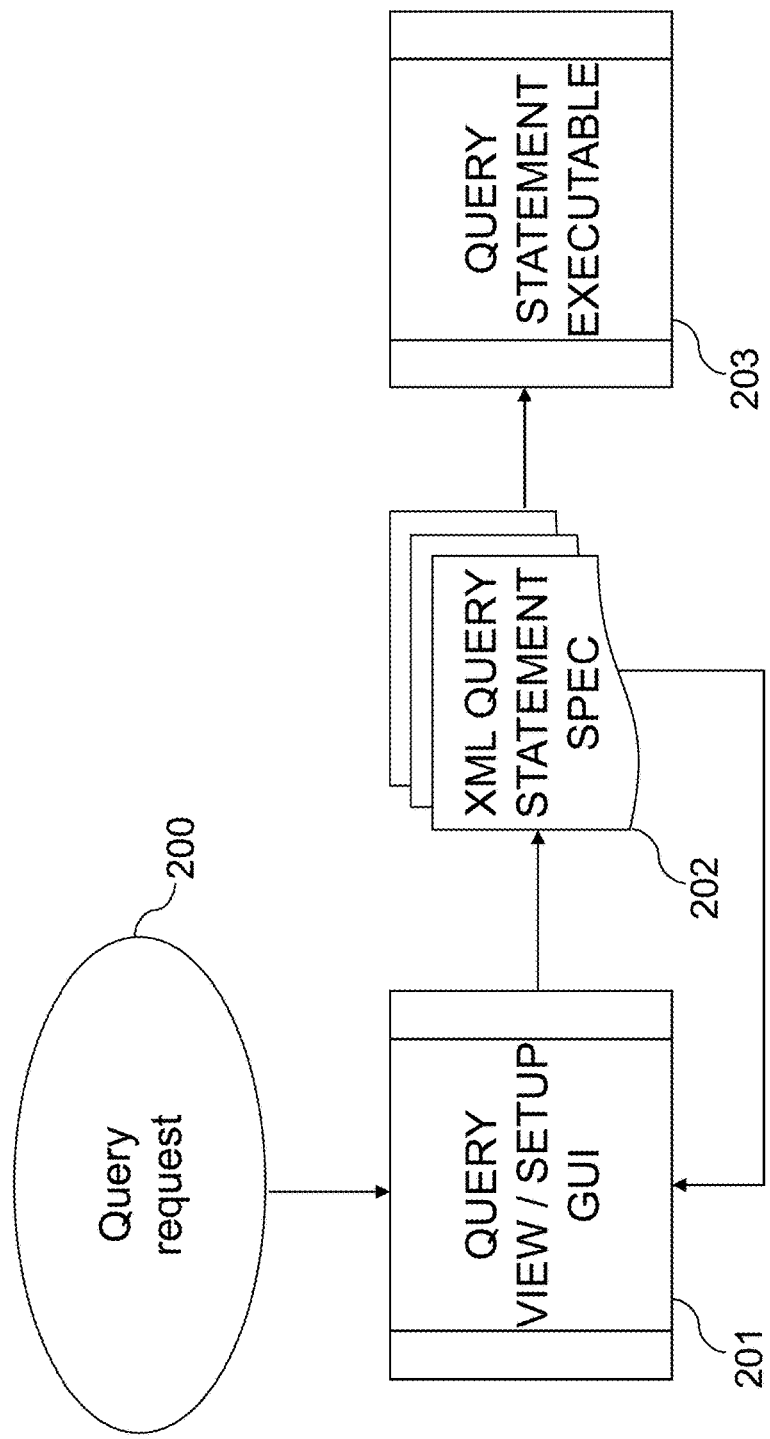
FIG. 2 illustrates some elements used for the creation and execution of a query statement.

As per FIG. 2, a query request 200 may be created using a graphical user interface (GUI) 201. The GUI 201 is used to view and/or set-up the query request 200, from which a query statement 100 will be generated. The GUI 201 allows the relationship between the sources 101, parameters 102, and the result 103 to be displayed to the user. Query statements 100 may be saved as mark-up language files, such as XML files 202 or other such files. If changes are required, the GUI 201 can load previously created XML files 202. A query statement executable 203 can use previously created XML files 202 to generate a query result 103 through a separate and independent process. The query statement executable 203 may be, for example, of an EXE, COM, or DLL type, or it may be attached to a server or a web service.

Query statements 100 are built to define result target fields from a series of operations that are applied recursively in order to transform (and sometimes aggregate) the data from the data sources 101 into query results 103. Some exemplary operations for transforming the data are map, calculate, find, format, left, length, replace, right, part, ToSplit, trim, switch, and ExcelFx. They are defined as follows:

Map: to combine values from multiple nodes;

Calculate: to apply mathematical formula to nodes;

Left/Right: to return number of characters retained from left/right side of node;

Part: to return a number of characters retained from the first node starting from a second node for the length of the third node;

Trim: to remove characters from beginning of node, end of node, or both;

Length: to count node value number of characters;

Format: to transform first node value format to second node format; with optional definition of original format using the third node. This can be used as a way to convert data from one format to another.

Find: to find value position in text of first node or to count the number of occurrences of the second nodes in the first node;

ToSplit: to divide first node in sections of second node and return section number of third nodes; and Switch: to apply basic "IF" condition application by comparing the first node against the third node using the second node operator. The return value has two options—true to return the fourth node or false to return the fifth node.

Each operation has one or more attributes that define the parameters of the operation. For example, the operation "left" has two attributes (nodes). They are an initial value and a length to keep. The operations may be used to define a target field, a filter (in or out), or the way data is to be aggregated/grouped by selected target fields. The attributes are set as nodes in a tree-like transformation, as will be illustrated below.

Figure 3:
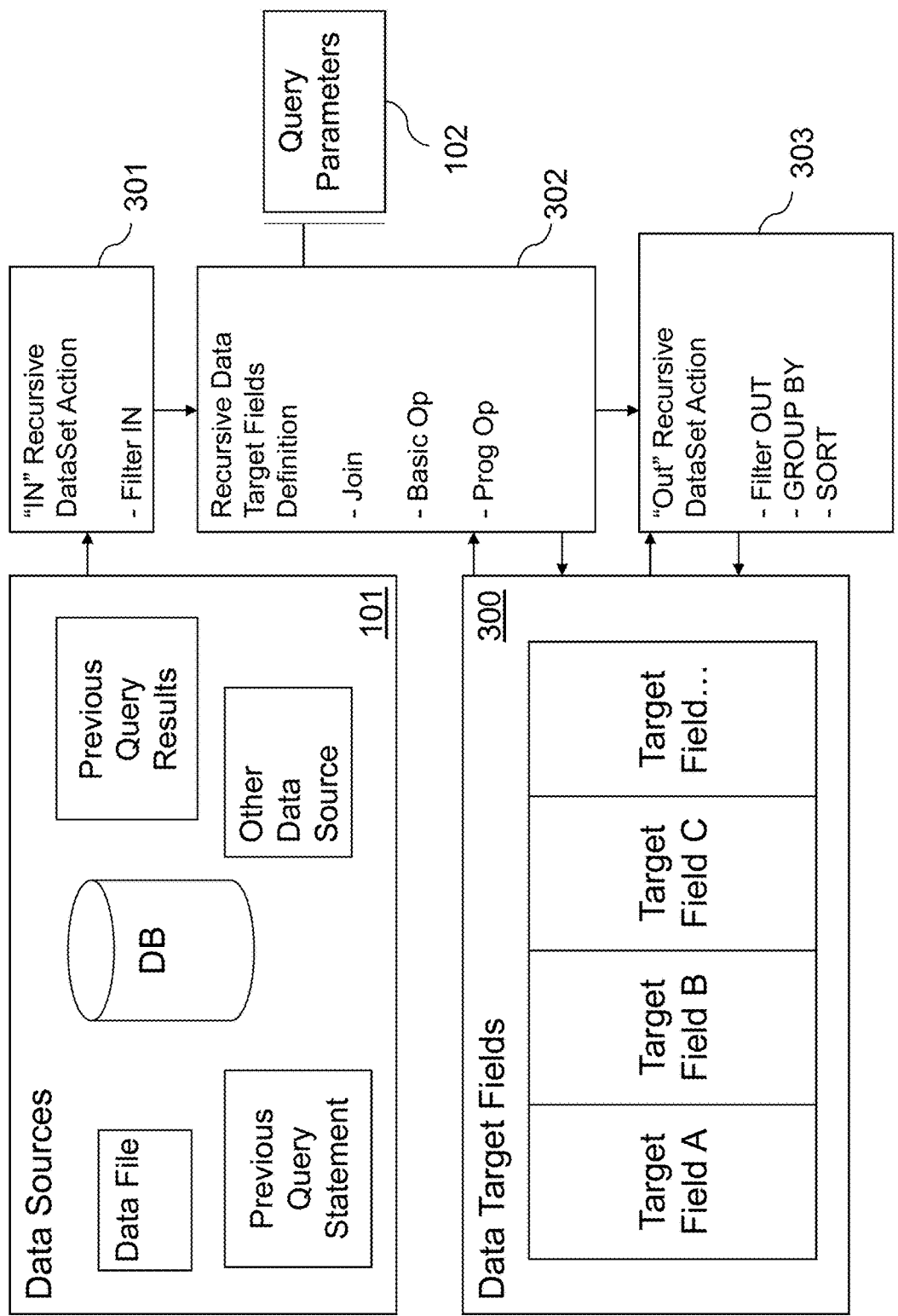
FIG. 3 is a generic example of elements used in the creation of a query statement.

FIG. 3 is a generic example of how a query statement 100 is created. One or more target fields 300 are defined and populated with query results 103 using a series of nested operations 302 having associated attributes. In some embodiments, data from one or more data sources 101 may be passed through an initial filter 301 to reduce the size of raw data to be used in subsequent steps of the process. This filtering step may involve using recursive or nested operations on target fields, global parameters, or hard coded values. The target fields 300 may comprise standard or joined results. Joined results combine two target field results from two or more data sources into a single target field, whereas standard target fields have a single root and take data from any source. Joined target fields may use recursive transformation in the definition of the target results. Operations 302 are applied to the raw data or to results of previous operations. Results of the operations may be further processed 303, for example by filtering, grouping, or sorting the results. Some examples of grouping are grouping by select, sum, average, count, count distinct, max, min, avg, first, last, percent, total, product, etc.

In some embodiments, data from one or more data sources 101 may be grouped by selected data source fields to modify the content without having to create a new query statement. In other embodiments, a simplified query statement having only one source may be created to apply against a data source 101 in order to use a modified source without having to create a new query statement. This is called a "statement style" query, is only temporary in the query statement, and is applied only to redefine the source. Such a query has a single source, the original source.

Referring to FIGS. 4a to 4f, there is illustrated a specific example for creating a query statement 100 using an exemplary GUI 201. The example shows one way in which a data source having a list of full names may be queried to return the first name of each row.

Figure 4A:
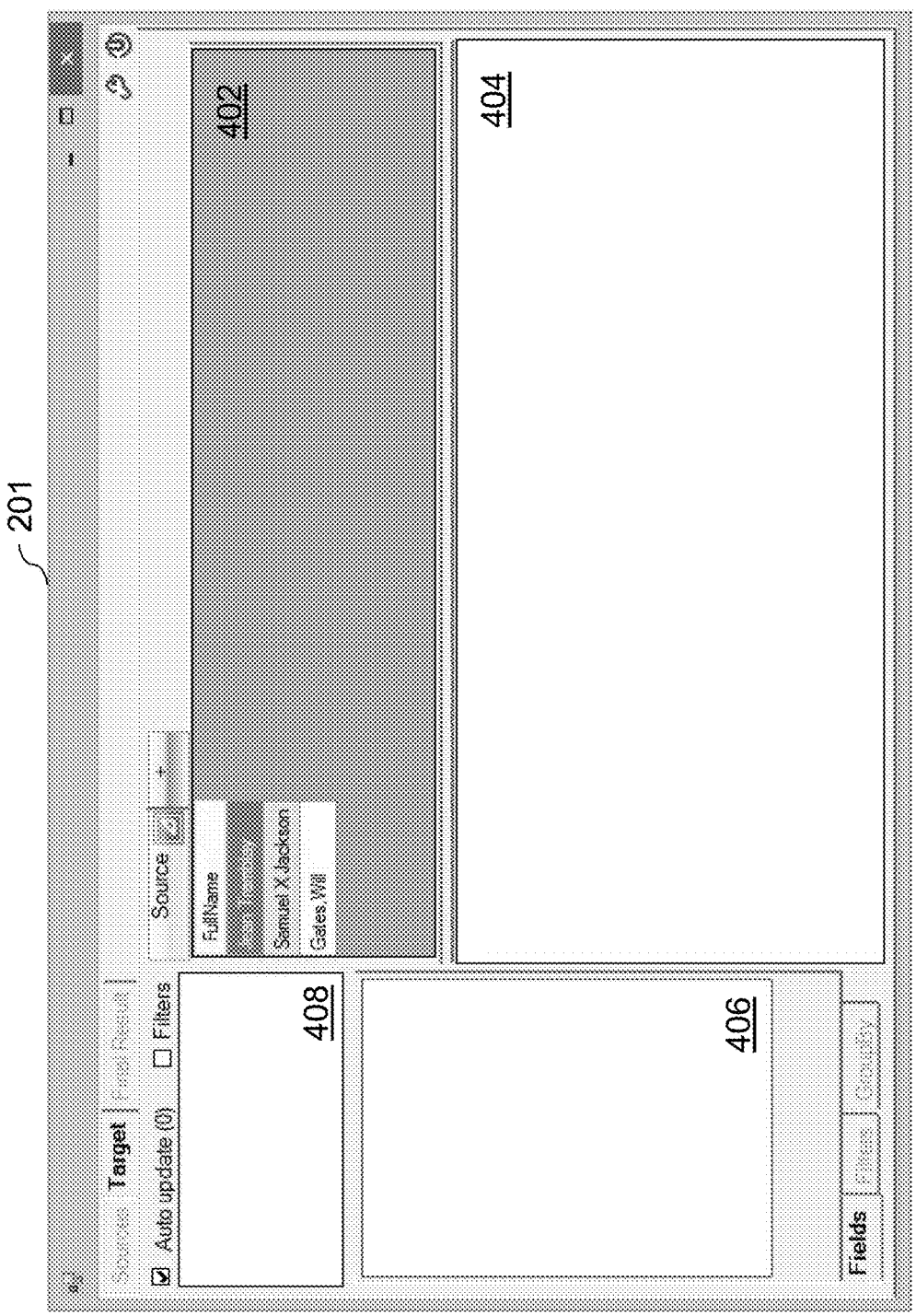

FIG. 4a illustrates the GUI 201 comprising a data source area 402, a query results area 404, and an operations area 406. The data source area 402 displays the content of a data source 101. A pull-down menu or other selection means may be provided to select which data source is to be displayed in the data source area 402. The query results area 404 displays the query results 103 as they are generated, and the operations area 406 displays each operation applied to the data and its corresponding attributes. A results definition area 408 is also provided to display the parameters used to define how the target results in the results area 404 are displayed in the final query result. In FIG. 4a, the operations area 406 and query results area 404 are blank as no operations have yet been defined. The data source area 402 displays three rows of a source field called "FullName" from a data source called "Source". Note that the names and content of targets fields and data sources used herein are for illustrative purposes only.

Figure 4B:
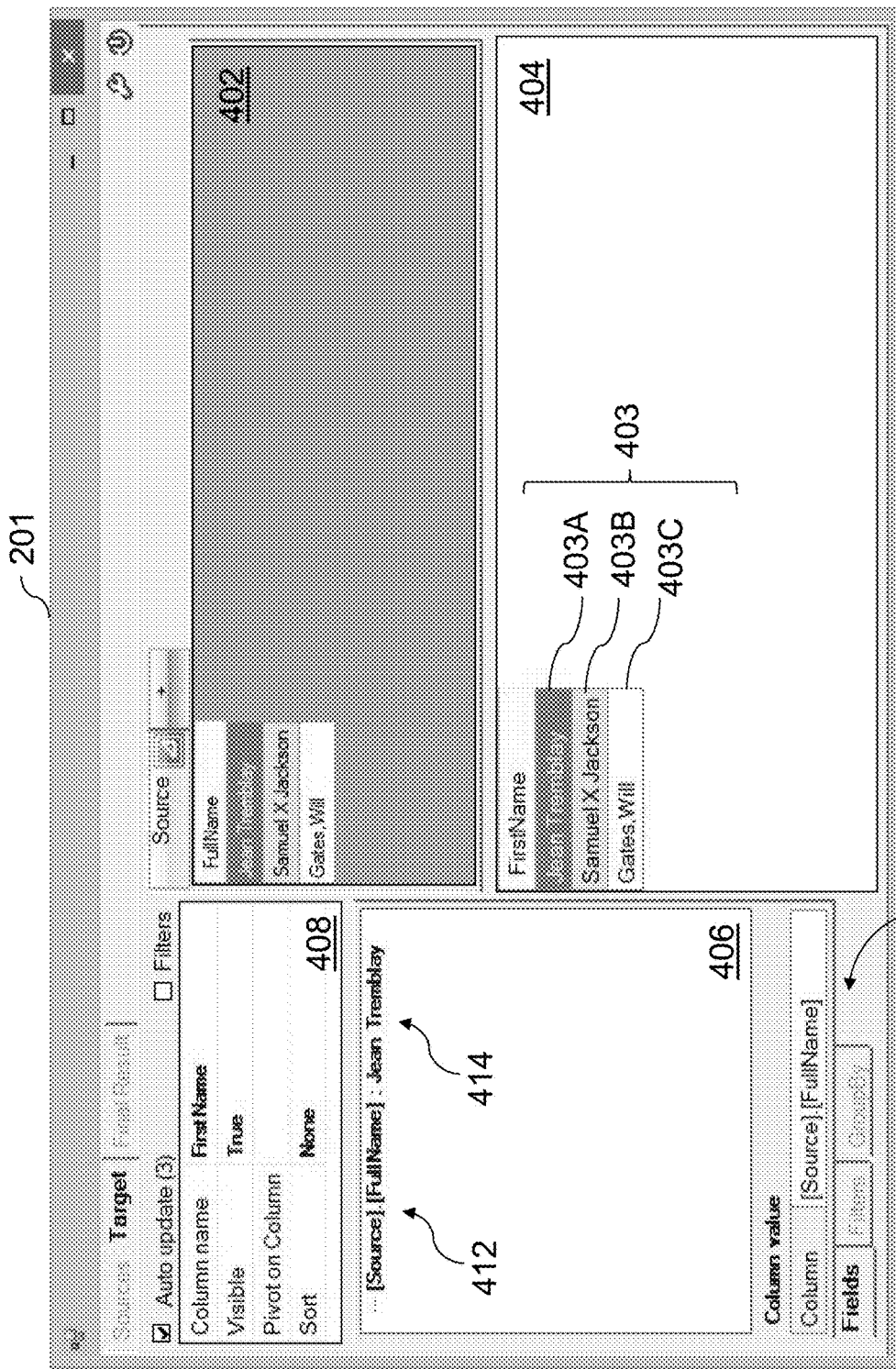

FIG. 4b illustrates a first operation having been entered in the operations area 406. The operation is used to populate the target fields 403 in the results area 404 with an initial string of characters. The operation in this example is simply to return the value of a given field in a given source. An operation attribute 412 is displayed as "[Source].[FullName]", referring to the field called "FullName" in the source called "Source". The returned result 414 is "Jean Tremblay", which is displayed next to the attribute 412. An attributes area 410 is provided in the GUI 201 to display the attributes of a selected operation. This feature is useful when the query results 103 are obtained using a plurality of nested operations, each having its own attributes, as will be shown below.

Figure 4C:
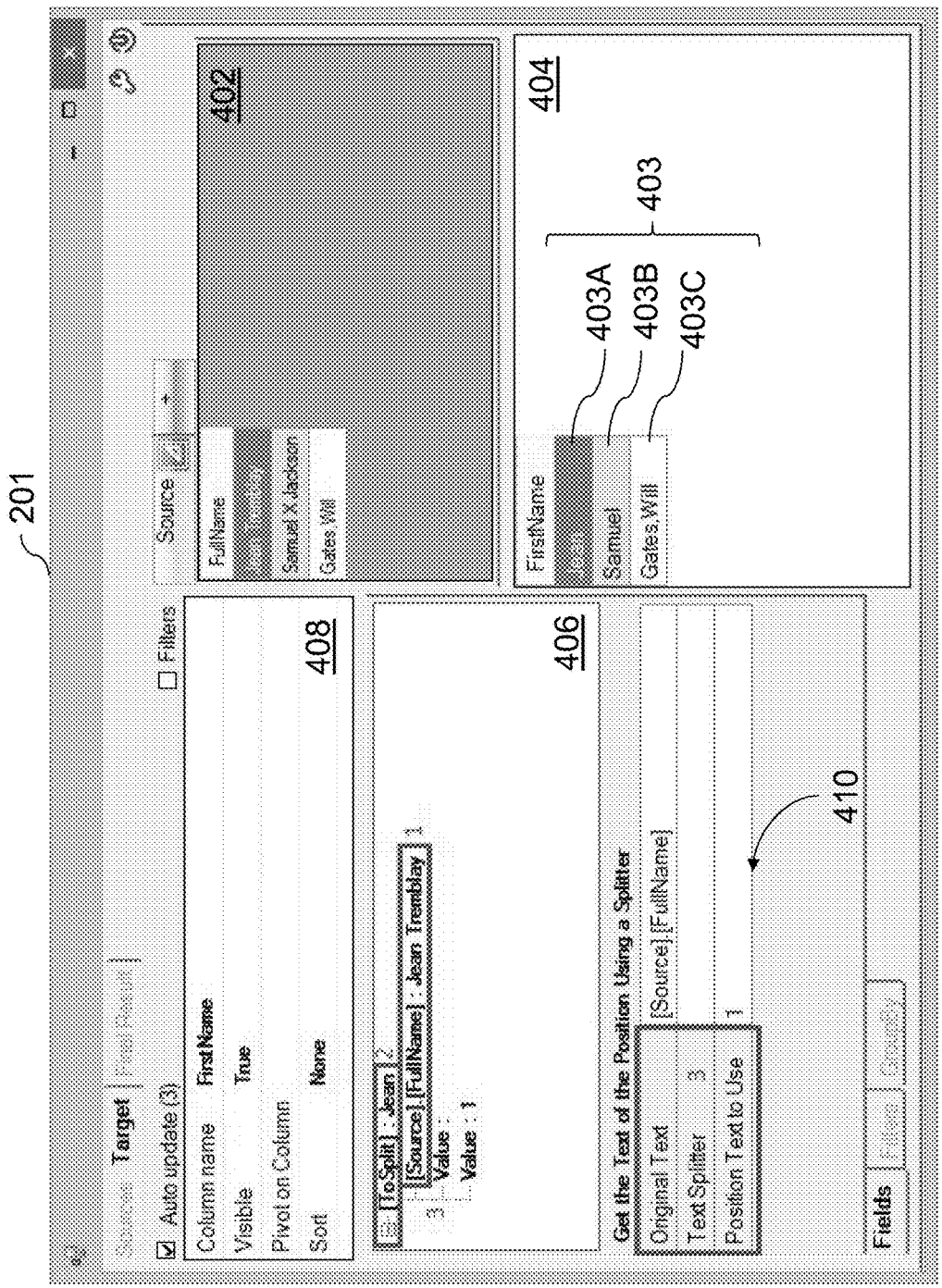

In FIG. 4c, another operation has been added to the operations area 406. The operation is entitled "ToSplit" and comprises three attributes, which are displayed in the attributes area 410. It should be noted that the names of the operations are only illustrative and may vary. The operations may be predefined, having a predetermined number of attributes associated thereto, and each attribute having a predetermined purpose or role in the operation. For example, for the operation "ToSplit", a first attribute refers to a string of characters on which the operation is performed. In this case, the string of characters is the result from the previous operation, namely "Jean Tremblay". A second attribute refers to what is sought within the string of characters, which in this case is a space. A third attribute refers to which block of text should be returned once the "space" has been encountered in the string of characters, namely the first block of text, which is identified by "1". The result is "Jean", which is displayed next to the operation name "ToSplit". This operation has thus been set to return the first block of text in the string of characters separated by a space. If the value "2" had been entered as the third attribute instead of "1", the returned result would have been "Tremblay" instead of "Jean". In the results area 404, field 403a is displayed as "Jean", field 403b is displayed as "Samuel" and field 403c is displayed as "Gates, Will" because the is no space in the string of characters "Gates, Will". As demonstrated with this example, operations may be set to return the original value when no other option is possible.

Figure 4D:
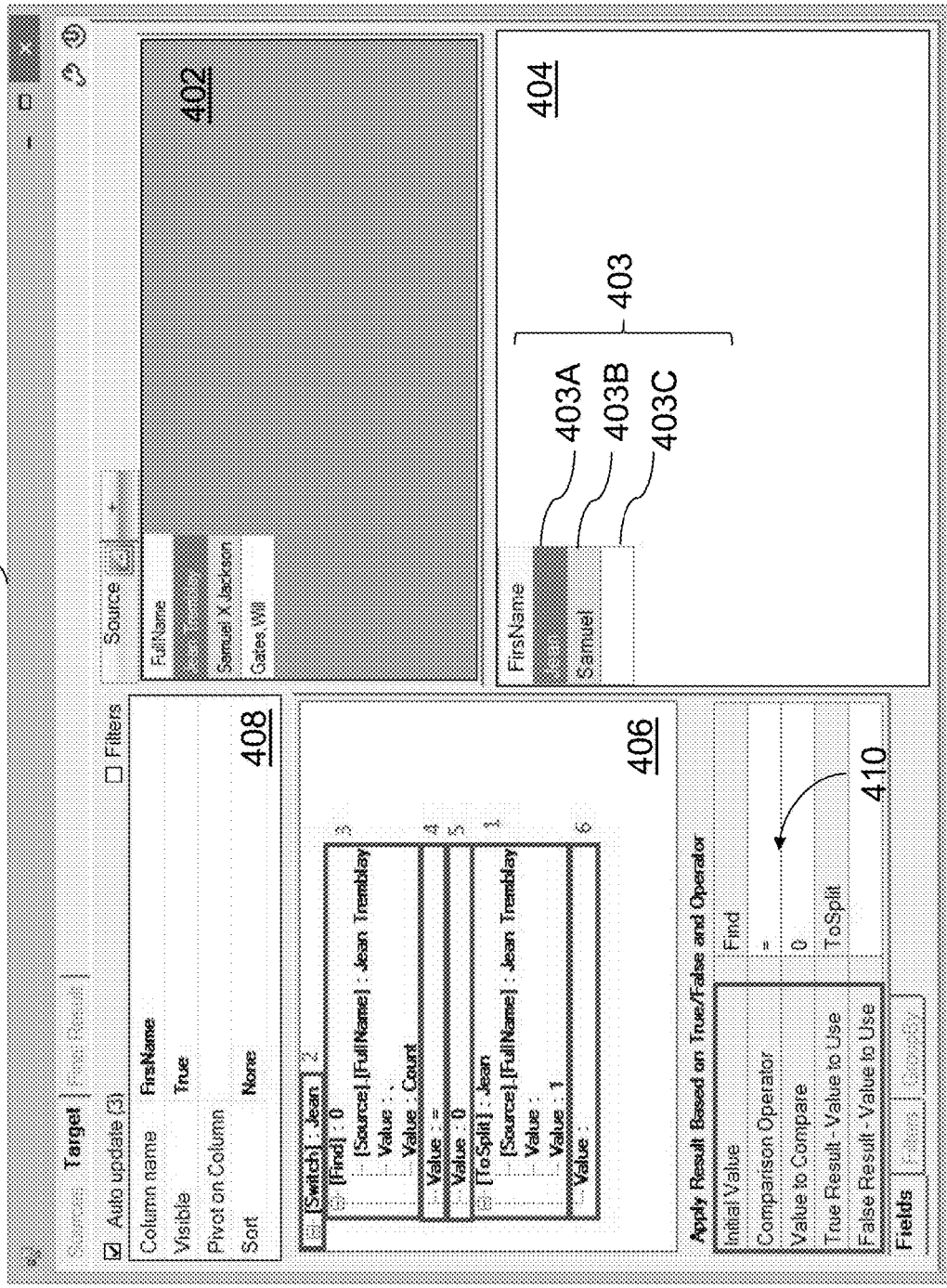

FIG. 4d illustrates the query having been further expanded by adding another operation in order to change the result returned in field 403c. The newly added operation is entitled "Switch" and it has five attributes. As listed in the attributes area 410, the attributes are an initial value, a comparison operator, a value to compare, a value to use if the result is true, and a value to use if the result is false. The initial value is set to "Find", which is itself an operation having three attributes. Its three attributes are a string of characters defined by the field "FullName" in the source "Source", a text splitter to look for (in this case a comma), and a count of the number of occurrences of the text splitter. The returned result of the operation "Find" is "0" for the first row of the field "FullName" of the source "Source". Indeed, there are no commas in the field of the first row. The "Switch" operation is thus set to determine if "0" "=" "0". If the outcome of the comparison is true, then the value returned is the fourth attribute (i.e. the operation "ToSplit" is performed). In other words, if there are no commas in the field, return the first block of text in the string of characters separated by a space.

Figure 4F:
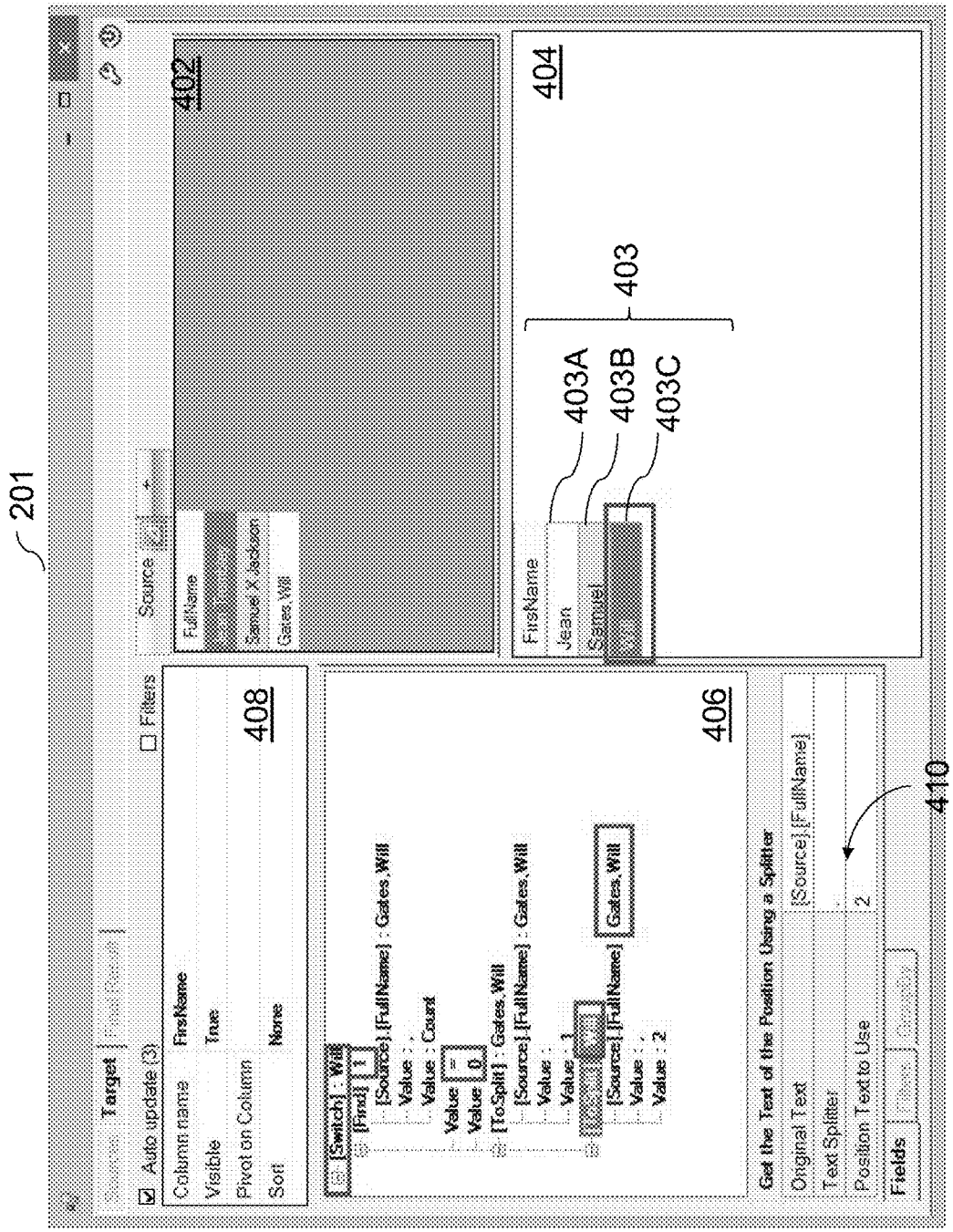

FIG. 4e illustrates the value to return for a false result of the "Switch" operation, which is the result from the fifth attribute. Another "ToSplit" operation has been added as the fifth attribute. In this case, the text splitter is a comma instead of a space, and the position of text to be returned is the second block of text instead of the first. Therefore, if there is a comma in a field, the text after the comma is returned instead of the text before the space. FIG. 4f illustrates the results of the operations for the third row of the target field "FullName" of the data source. The result in field 403c is shown to be correctly displayed as it contains the first name "Will". In addition, each intermediate step of the transformation is displayed with its accompanying result. The user can select any one of the result fields 403a, 403b, 403c, and the results returned for that field are displayed in the operations area 406.

As illustrated in FIGS. 4a to 4f, the method allows the partial value of an attribute or of a final result to be displayed to the user throughout the process. This is a distinction to make with a method that uses programming scripts instead of the recursive transformation described herein. Programming scripts only output a final result. With the present method, partial results may be displayed systematically for each line of the operations. It is therefore easier to find a problem/bug and modify selected nodes to fix or enhance how each node is setup and returns results. As shown, the transformation of the target field, such as the one in FIG. 4c, may be expanded by looking at the partial value and knowing that the transformation needs to be corrected to accommodate the third row of "Gates, Will", as per FIGS. 4d, 4e, and 4f. This could not be easily done using program code without partial values.

Figure 5A:
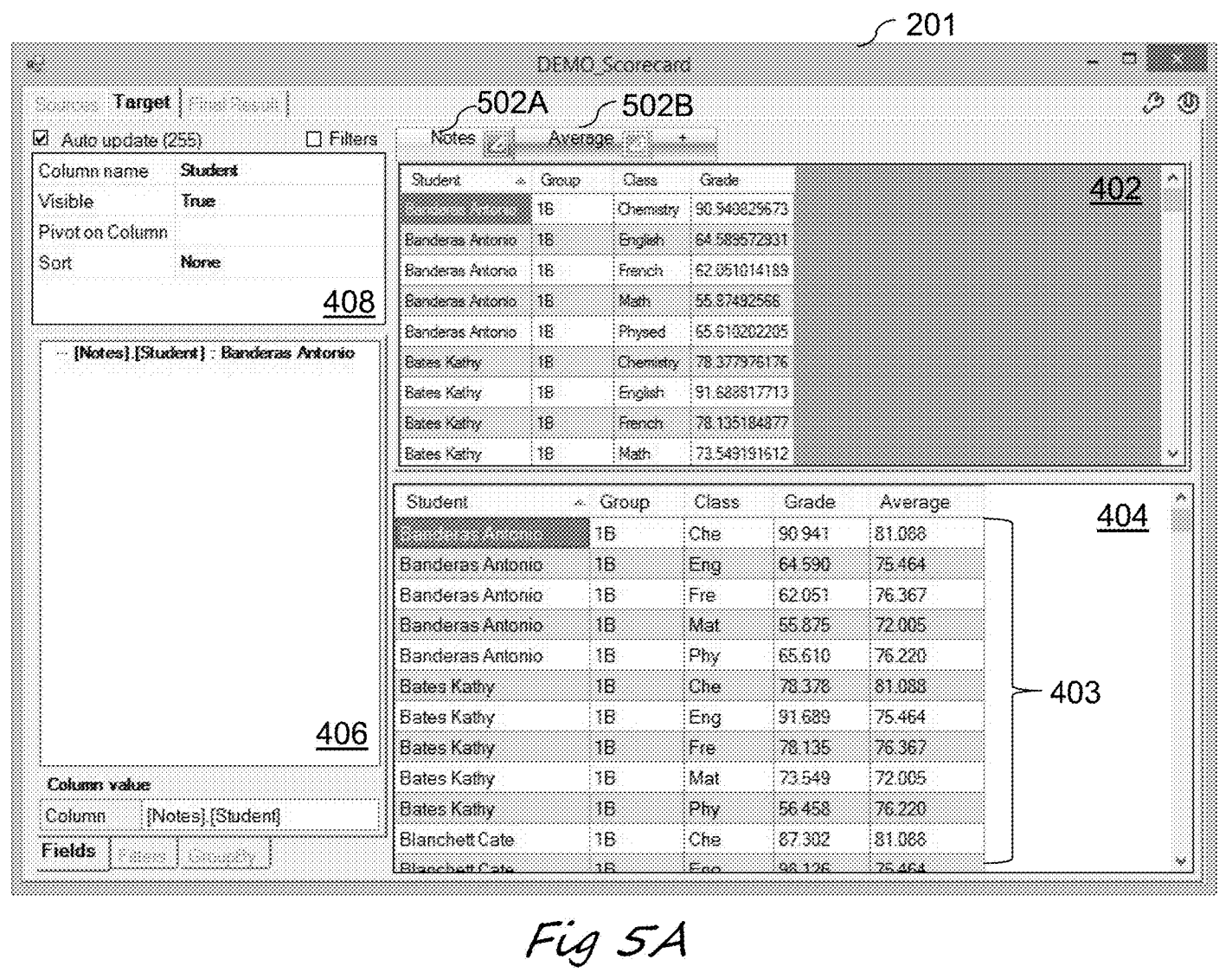
Figure 5B:
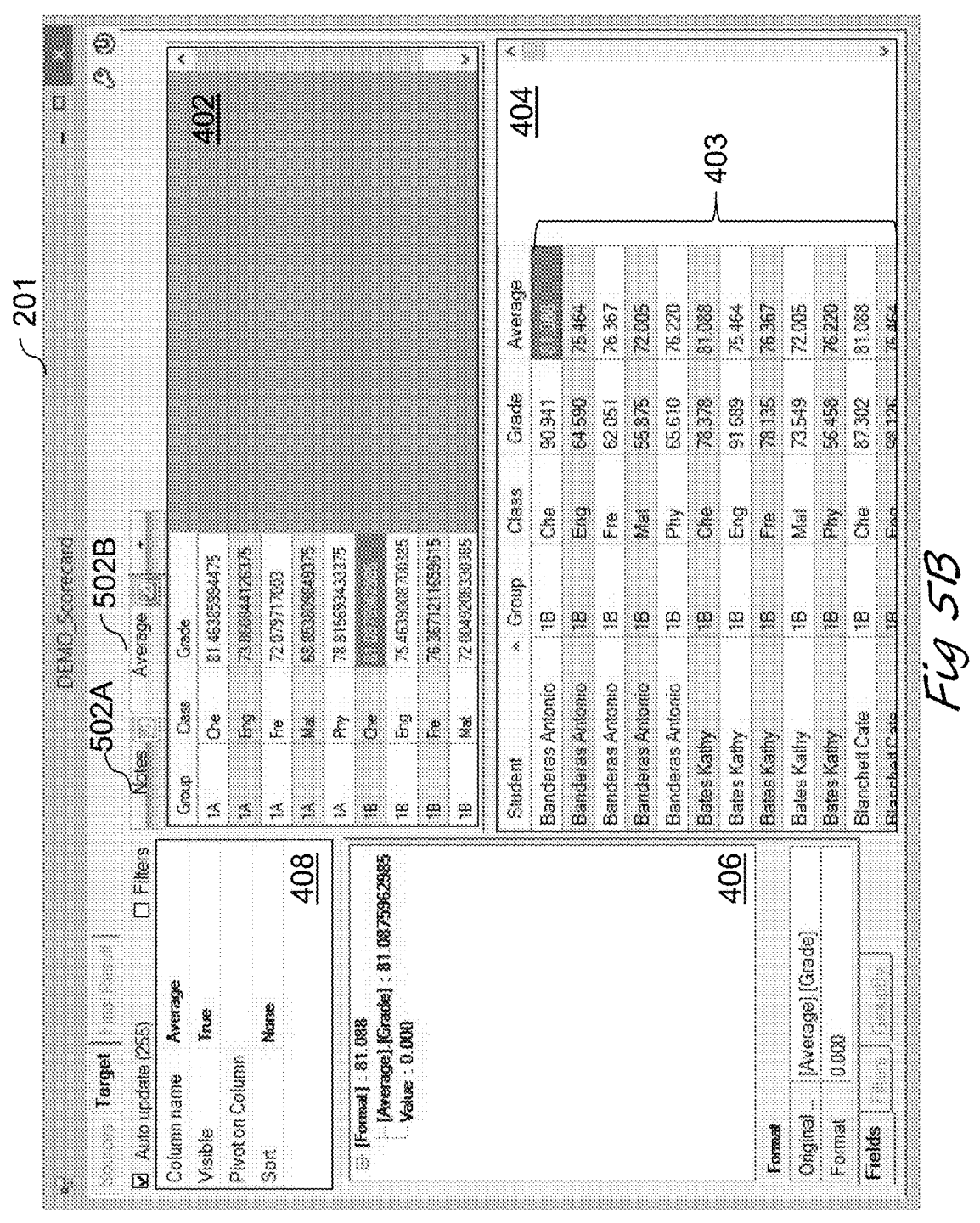
Figure 5C:
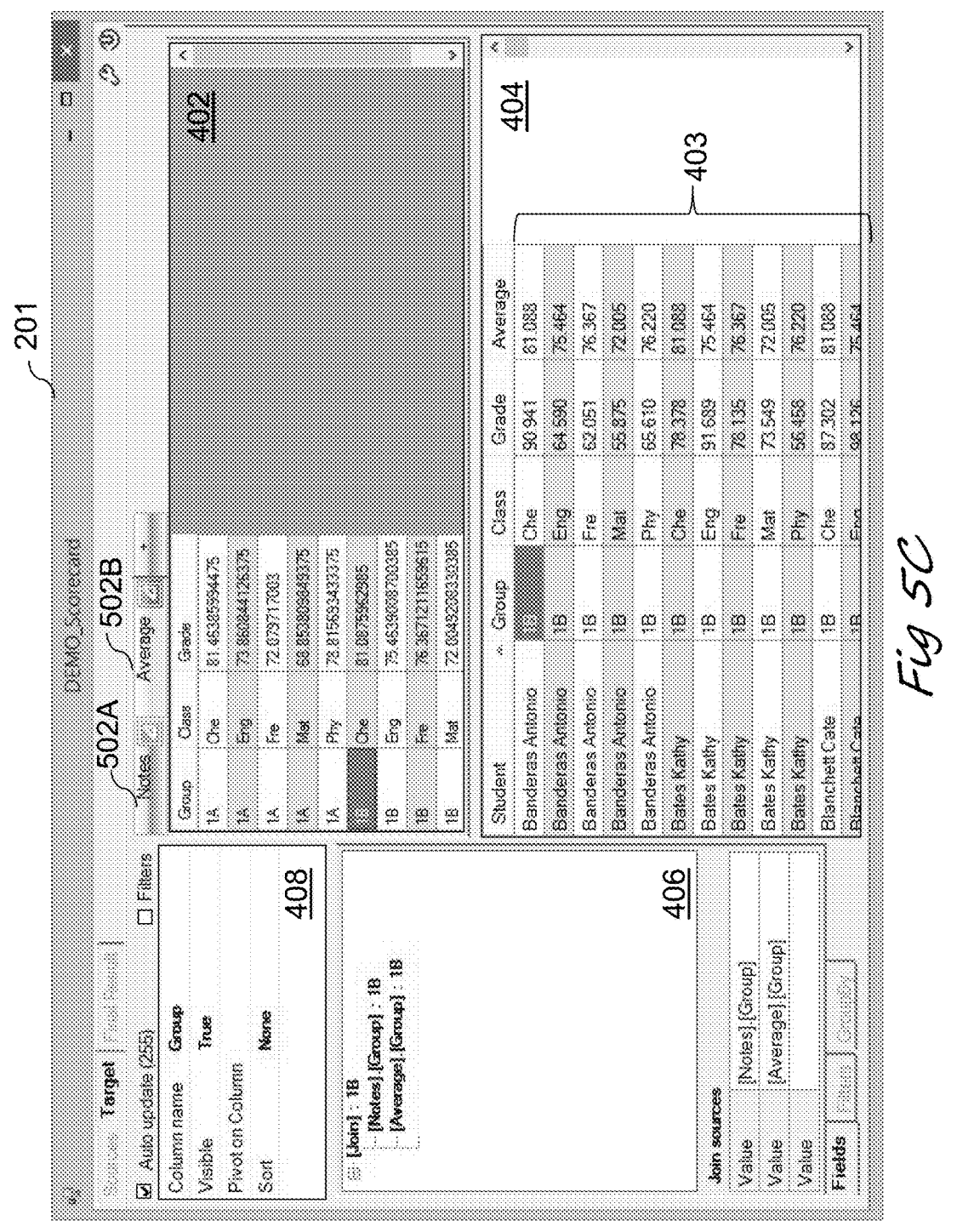
Figure 5D:
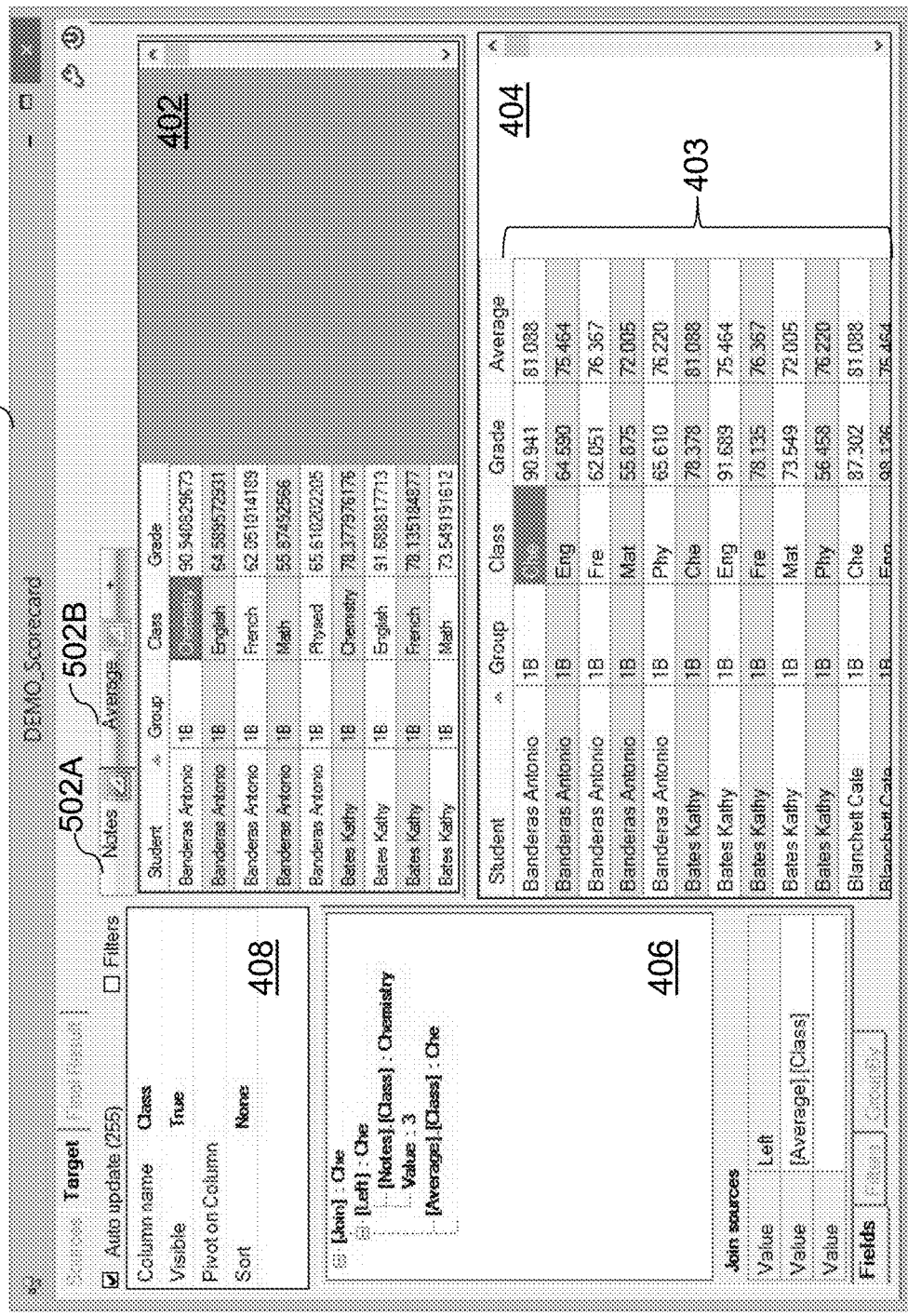

FIGS. 5a to 5d illustrate an exemplary embodiment of the creation of an automated join of two or more data source with joined target fields using recursive transformation. FIGS. 5a and 5b show the GUI 201 with two sources, namely "Notes" 502a and "Average" 502b, displayed in the data source area 402. In FIG. 5a, the source "Notes" 502a is displayed while in FIG. 5b, the source "Average" 502b is displayed. In the query results area 404, the target fields 403 shown are "students", "group", "class", "grades", and "average". Target fields "students" and "grades" have a single source, which is "Notes" 502a. Target field "average" has a single source which is "Average" 502b. Target fields "group" and "class" are joined target fields from sources "Notes" 502a and "Average" 502b. As per FIG. 5b, an operation "Format" is applied to the field "Grade" in the source "Average" 502b in order to return a four digit value instead of the entire value of the field.

FIG. 5c illustrates the process of creating the joined target field "class" from data sources "Notes" 502a and "Average" 502b. As displayed in the operations area 406, the operation "Join" has multiple attributes, each referring to the same field "Group" in the respective data sources "Notes" 502a and "Average" 502b. The content of both fields "Group" is 1B and thus the "Join" operation may be performed directly. In contrast, FIG. 5d illustrates the process of creating joined target field "class" from data sources "Notes" 502a and "Average" 502b. Since the content of the fields "Class" in the two sources is different, field "class" from data source "Notes" 502a is first transformed using a "Left" operation in order to return only the first three characters of the string, namely "Che". Once this transformation is made, the "Join" operation may then be performed properly to obtain the results in target field "Class". Without the application of the "Left" node, the join is performed on two disparate data values and therefore will return a number of rows equivalent to the sum of number of rows from both data sources as there is no join match.

Joined target fields may thus be created similarly to standard target fields, using the "Join" operation having attributes that identify the sources and fields to be joined. Additional operations may be nested in the "Join" operation in order to transform one or more fields from the sources for the "Join" operation. Two or more attributes may be set for the "Join" operation, as a function of the number of sources being joined into a given target field.

Joined target fields are used to bind two or more data sources in the query result. Multiple columns may be joined target fields. An Index of all matched rows from each source is created. The transformation to determine the value of each target field may be performed using the index.

The examples illustrated herein demonstrate one way to query a source having a plurality of rows with a field containing full names in order to return the first name in each field. Other ways may also be used based on the method and system presented herein. For example, different operations may be selected, the operations may be presented in different orders, and different attributes may be used. The nested nature of the operations allows a user easy access to the intermediate steps of the transformation, such that a first attempt that may return an incorrect result for one or more fields can easily be corrected, as demonstrated in the example above.

The operations are performed on the data from the data sources without affecting the raw data per se. Therefore, multiple operations may be performed in parallel using the same original raw data. An unlimited number of operations may be used to obtain the results of a query, as long as the steps in the query process are not circular.

Figure 6:
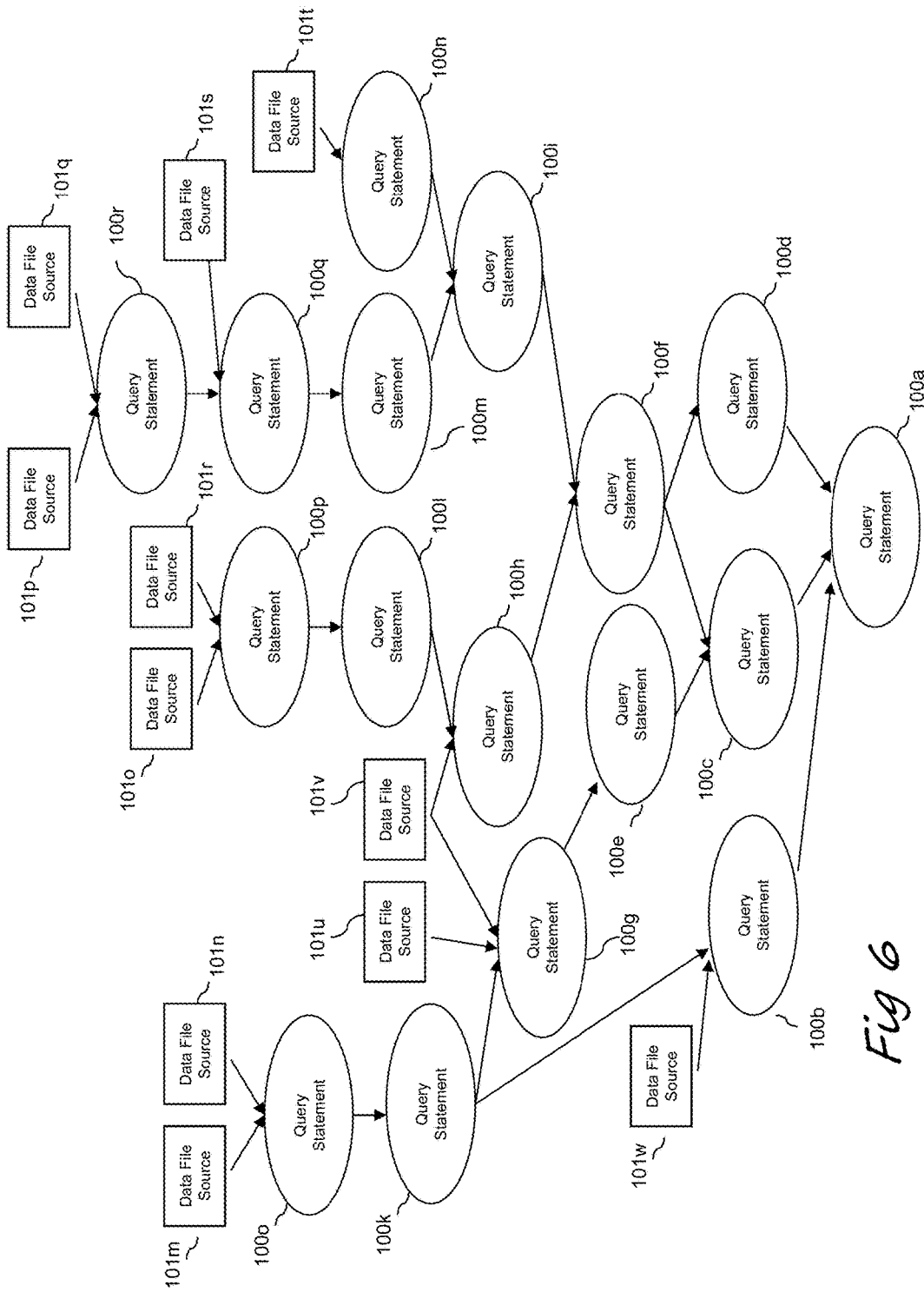
FIG. 6 illustrates an exemplary embodiment of query statements being used as data sources for other query statements.

In some embodiments, query statements 100 may be used as data sources for other query statements 100. One such example is illustrated in FIG. 6. When query statement 100a is executed, it calls as its sources query statements 100b, 100c, and 100d. When query statements are called upon as sources, data may be extracted from target fields of corresponding query results. Operations are presented in a same manner, whether the data source is a data file or another query statement. For example, a "ToSplit" operation in query statement 100a may have as an attribute "[query_statement_100b].[FirstName]" to identify the source and the field from which data is extracted. Query statement 100b calls as its source data file 101w, while query statement 100c calls as its sources query statements 100e and 100f. When query statement 100a is executed, this may cause query statements 100b, 100c, 100d, 100e, 100f, 100g, 100h, 100i, 100k, 100l, 100m, 100n, 1000, 100p, 100q, 100r to be successively executed. Query statement 100b will extract data from data file 101w, query statement 100o will extract data from data files 101m and 101n, query statement 100p will extract data from data files 1010 and 101r, query statement 100g will extract data from data file 101u and 101v, query statement 100h will extract data from data file 101v, query statement 100r will extract data from data files 101p and 101q, query statement 100q will extract data from data file 101s, and query statement 100n will extract data from data file 101t. Data extracted from the data sources 101m, 101n, 101o, 101p, 101q, 101r, 101s, 101t, 101u, 101v, 101w is passed from statement to statement until it reaches the initially called query statement 100a.

Figure 7:
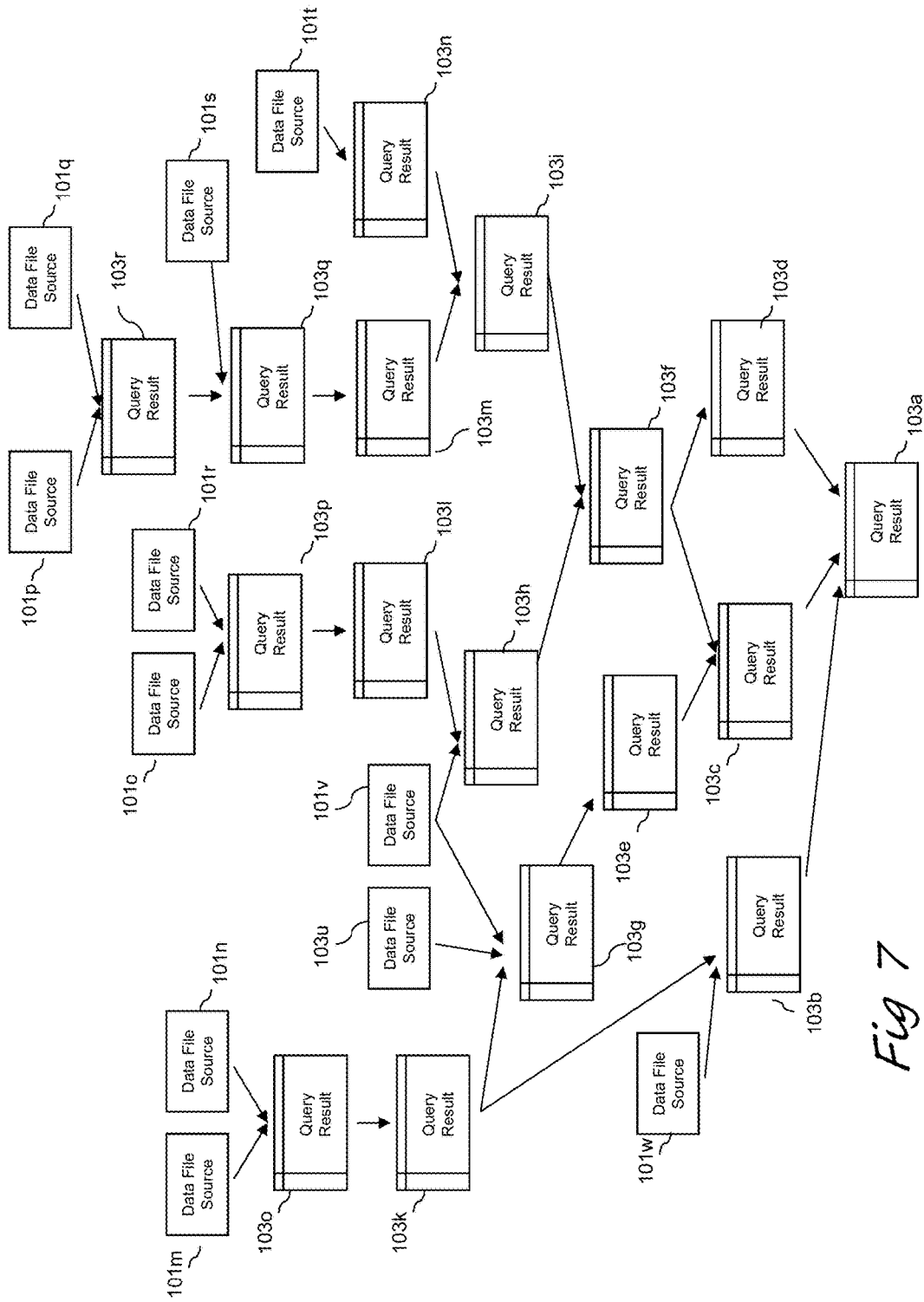
FIG. 7 illustrates an exemplary embodiment of the query results generated from the query statements of FIG. 6.

FIG. 7 illustrates the query results 103 that are associated with each query statement 100 from FIG. 6. Each executed query statement 100a-100r will generate a query result 103a-103r. More particularly, execution of query statement 100a will result in the execution of query statements 100b-100r, which will generate query results 103b-103r, which will in turn be used to generate query result 103a. Note that there is no indication in query statement 100a that any query statements other than 100b, 100c, 100d are used to generate query result 103a. Each query statement identifies only its direct sources. Should any one of those direct sources be another query statement that refers to another source, this is independent of the initial query statement.

In some embodiments, generated query results may be saved for reuse. As a query result file may be quite large, a simplified file containing information may be created to store, for example, the query statement name, parameter values used, source names, and last written date. Other information may also be stored in order to determine if the query statement may be reused. For example, if query results 103a-103r are saved after having been generated, and any one of these results is called again, a saved query result file may be used instead of regenerating the query result. Similarly, query statements 100 may also be saved and reused at a later time. Note that data sources 101 may be modified, for example by adding, removing or modifying content, changing a data timestamp, modifying a format of the data, or making any other type of change to the data source. In such instances, it may be necessary to regenerate a query result 103, depending on whether its source (direct or indirect) has undergone any type of change.

Figure 8:
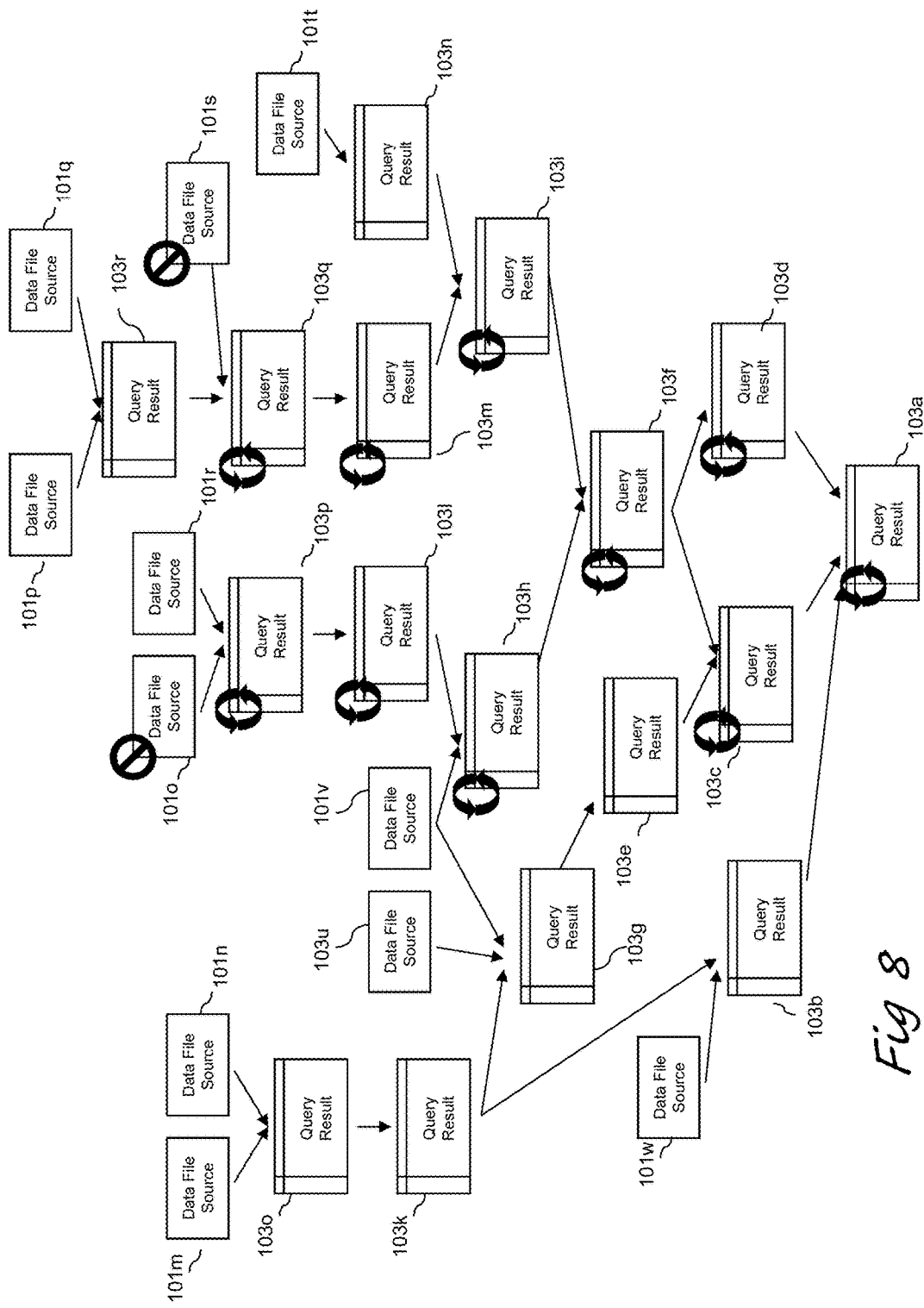
FIG. 8 illustrates an exemplary embodiment of some query results from FIG. 6 needing to be regenerated due to a change in a data source.

FIG. 8 illustrates an example where two data sources 1010 and 101s have changed. When query result 103a is called, a determination is made up the various chains of query results 103 to each data source 101m-101n with regards to whether any changes have been made. Any query result 103 found in a chain that ends with a changed data source is regenerated to account for the change. A recursive comparison of theoretical source to use against the simplified file may determine if a query result file may be used. Previously saved query results in these chains may be deleted and replaced with newly generated query results. In this example, query results 103a, 103c, 103d, 103f, 103h, 103i, 103l, 103m, 103p, and 103q are regenerated. To do so, query statements 100a, 100c, 100d, 100f, 100h, 100i, 100l, 100m, 100p, and 100q are re-executed. Saved query statements 100 may be retrieved and re-executed instead of having to recreate query statements 100a, 100c, 100d, 100f, 100h, 100i, 100l, 100m, 100p, and 100q.

Note that parameters 102 may be used in some but not all query statements 100. Not all statements 102 need to use parameters and they do not need to be passed from one statement to another. In some embodiments, parameters 102 may be set as global parameters to be used in all query statements 100 during a same session. Default values may be used if the parameters 102 are not set when a query result, such as query result 103a, is called. Ad hoc parameters may also be provided for certain query statements 100. Query results generated using ad hoc parameters may be saved with source and parameter information therein.

Figure 9:
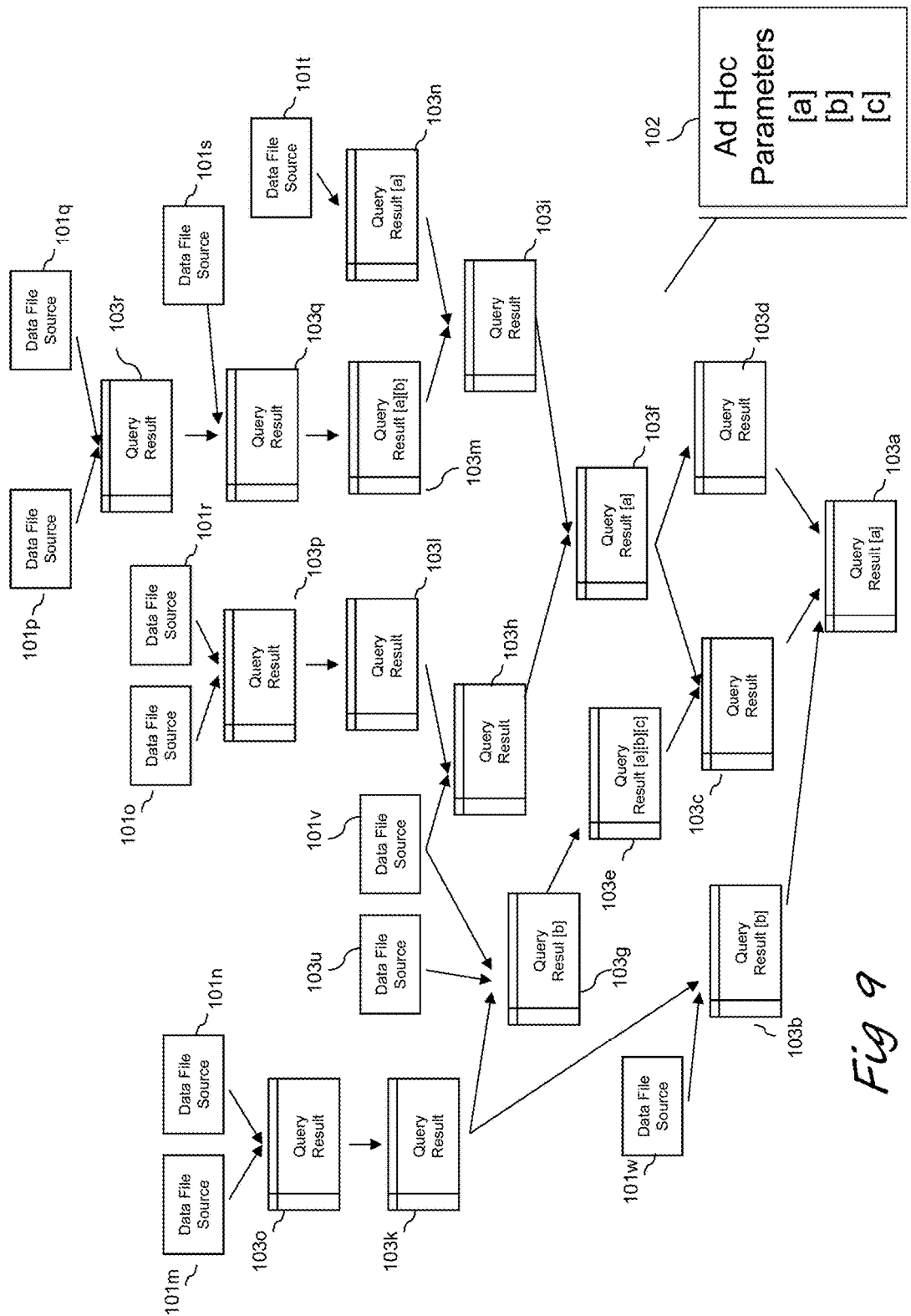
FIG. 9 illustrates an exemplary embodiment of how ad hoc parameters are passed to query results.
Figure 10:
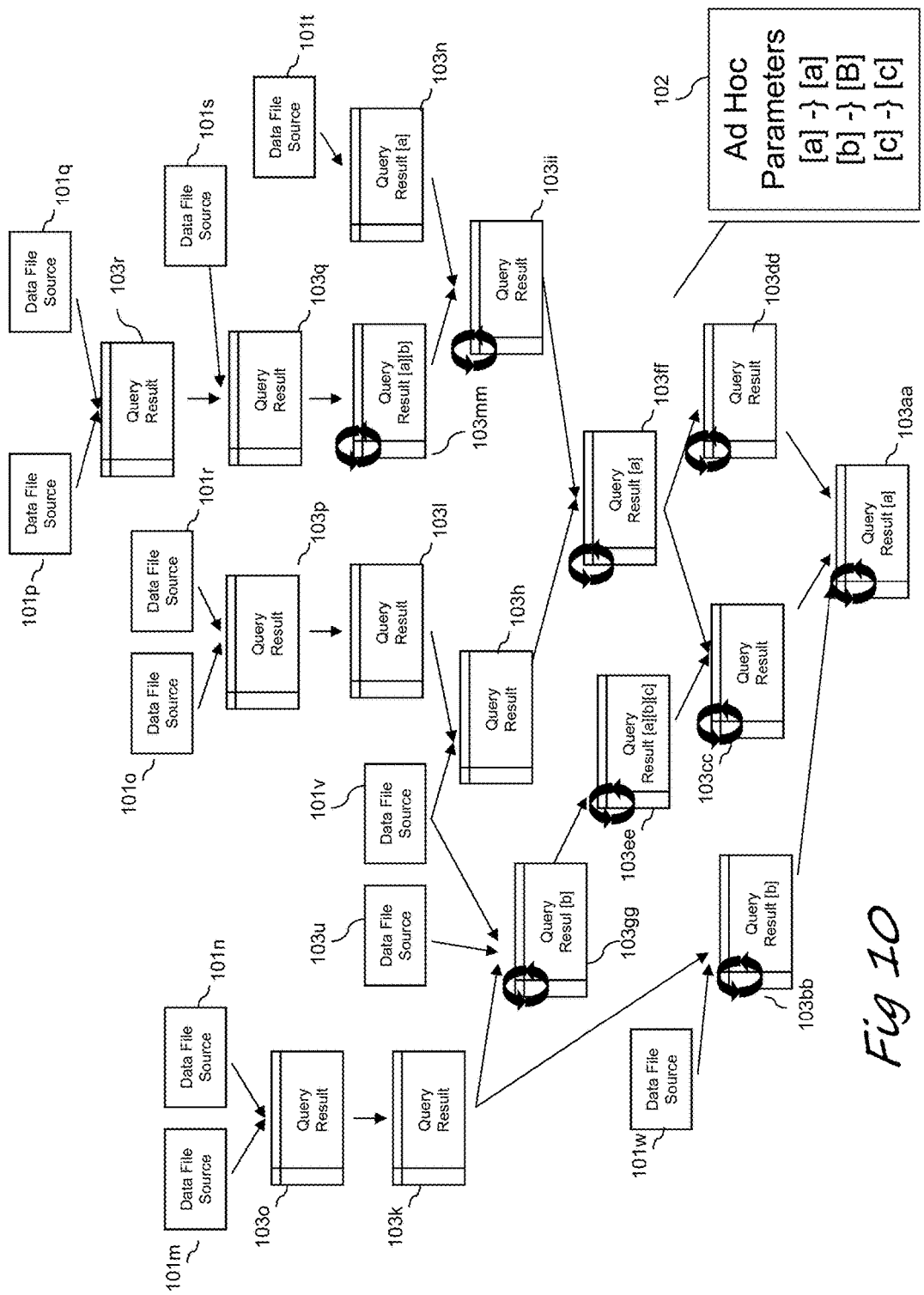
FIG. 10 illustrates an exemplary embodiment of some query results from FIG. 9 needing to be regenerated due to a change in parameters.

FIG. 9 is an example where ad hoc parameters [a], [b], [c] are used for generation of a subset of query results 103, namely 103a, 103b, 103e, 103f, 103q, 103m, and 103n. FIG. 10 is an example where query statement 100a is executed with the same unchanged data sources and the same target fields as those used to generate query result 103a in FIG. 9, but parameter [b] has been changed to [B]. As such, query results that are unaffected by the change in parameter may be reused without being regenerated. Query results that are affected by the change in parameter, i.e. those that use parameter [b] and those that come from a query result that uses parameter [b], are regenerated. In this example, query results 103b, 103q, 103e, and 103m use parameter [b], and query results 103a, 103c, 103d, 103f, and 103i come from one or more query results that uses parameter [b]. They are thus regenerated. New query requests 103bb, 103gg, 103ee, 103mm, 103aa, 103cc, 103dd, 103ff, and 103ii may be saved. Indeed, previously saved query results 103bb, 103g, 103e, 103m, 103a, 103c, 103d, 103f, and 103i do not need to be deleted as the sources have not changed. Should a query request with the same data source, target fields, and parameters [a], [b], [c] be made, previously saved query request 103a may be used.

In some embodiments, a hybrid scenario may be encountered, whereby some but not all parameters are changed, and some but not all sources are changed. Query results found in a chain that ends with a changed data source are regenerated to account for the change, and query results that are affected by the change of parameter are also regenerated. Query results regenerated due to a changed source will replace previously saved query results, while query results regenerated due to a changed parameter will be added to the set of saved query results.

Figure 11:
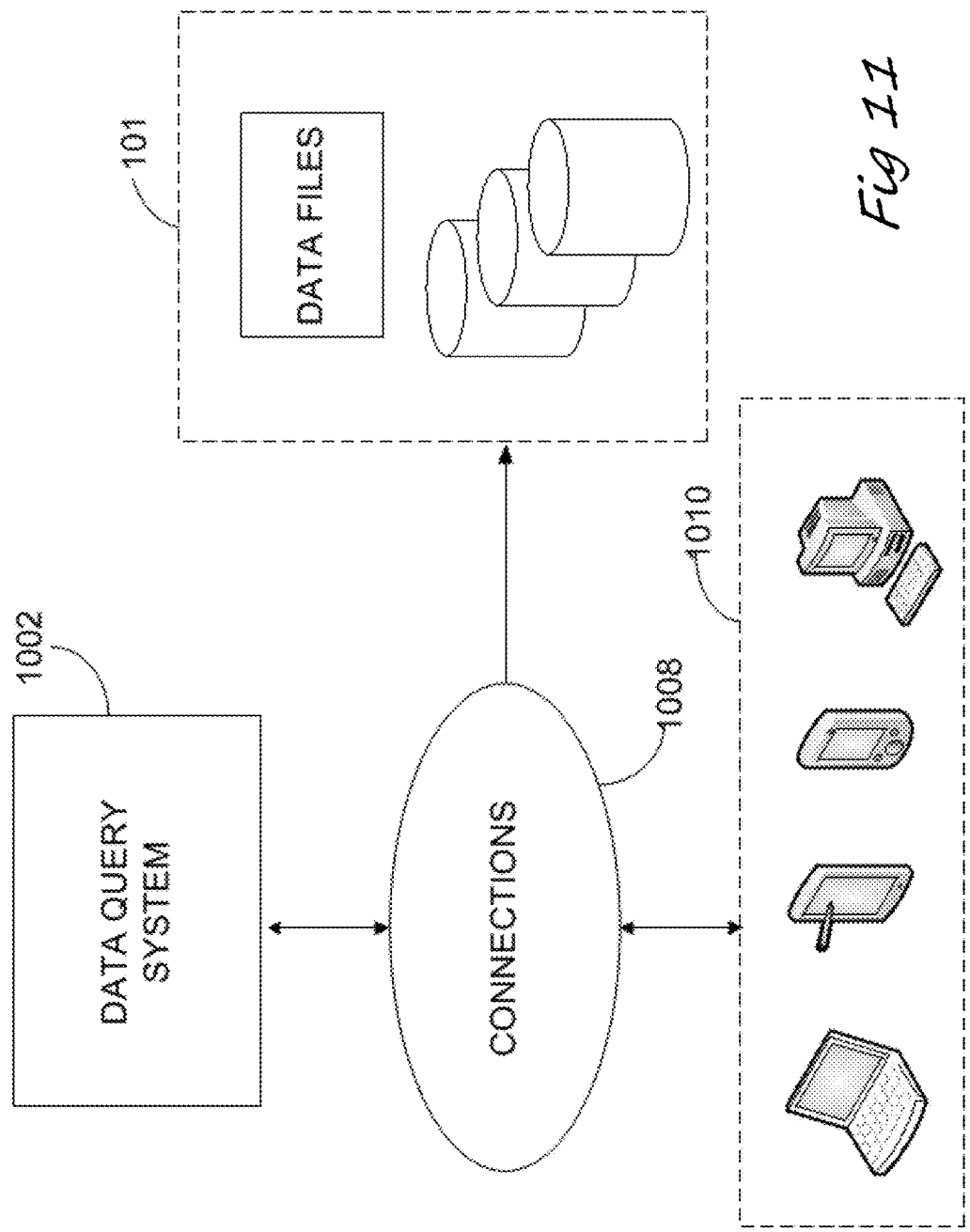
FIG. 11 illustrates an exemplary system for querying data.
Figure 12:
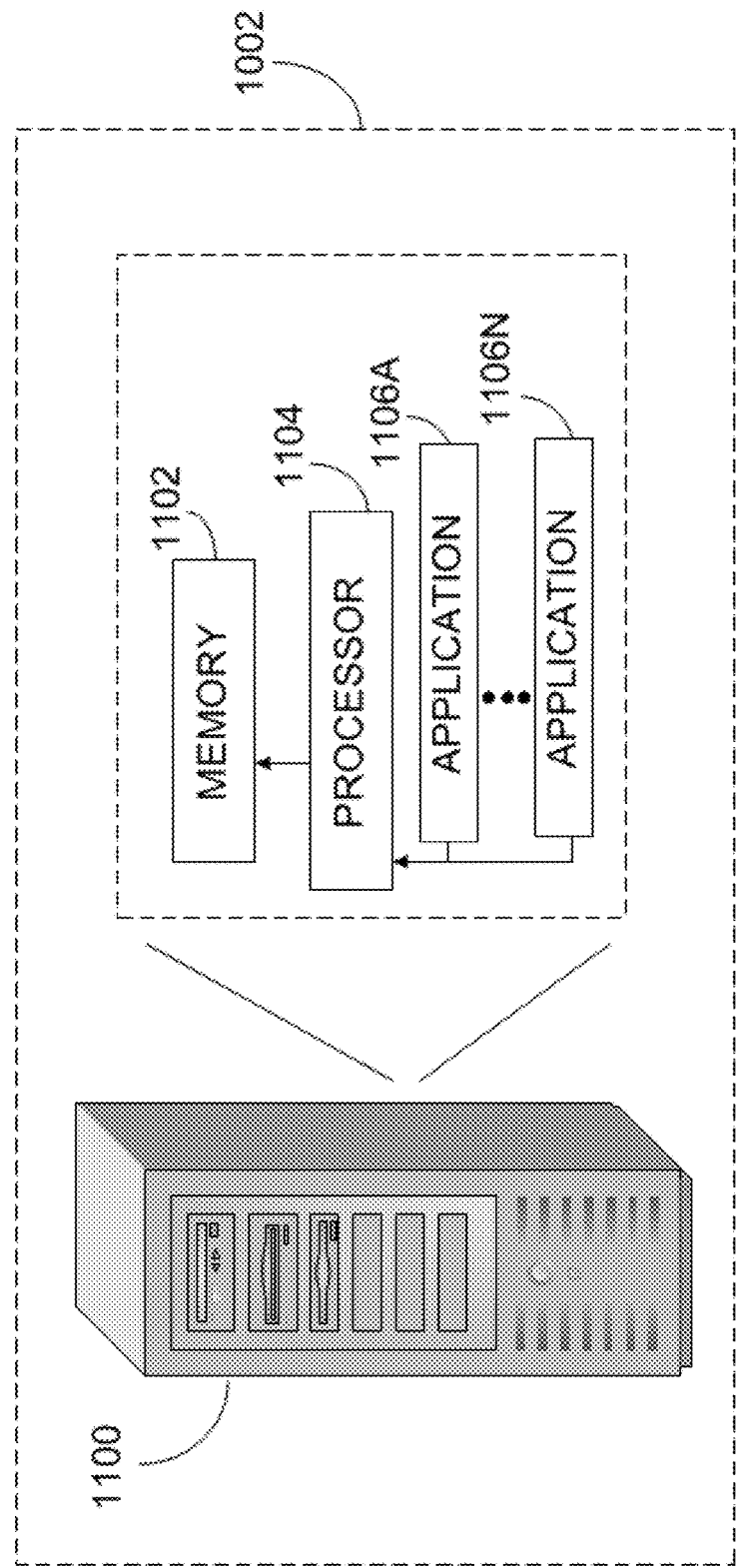
FIG. 12 illustrates an exemplary embodiment for the data query system of FIG. 11.
Figure 13:
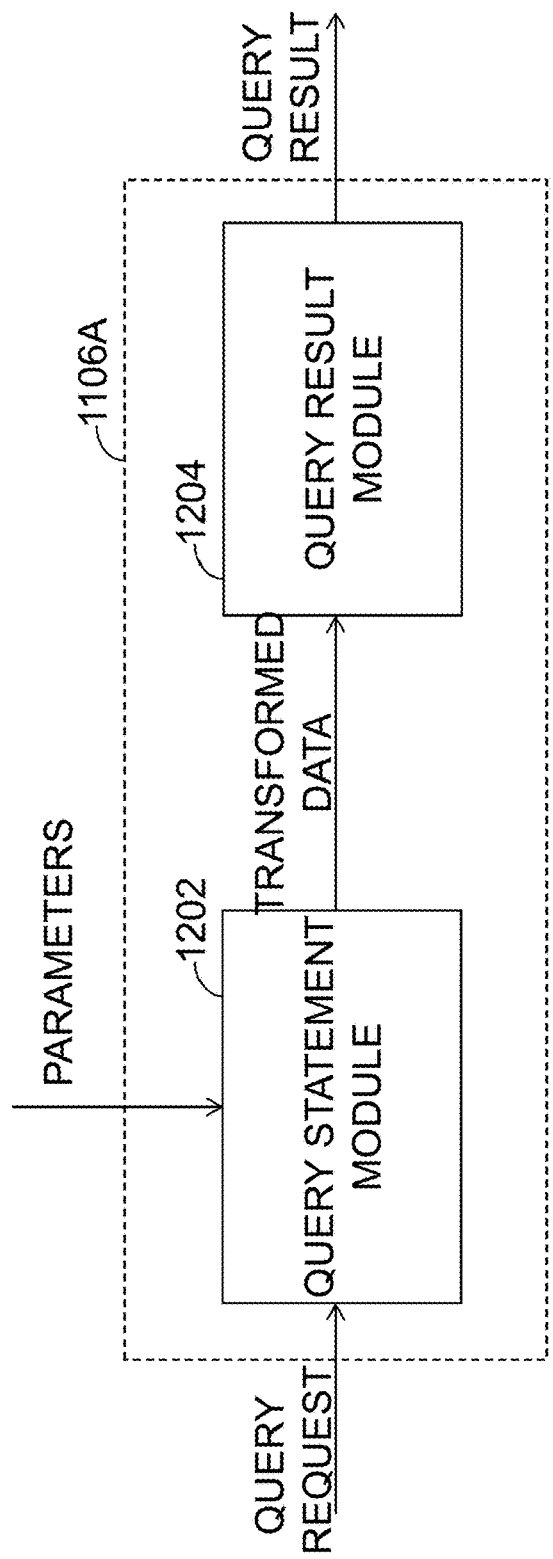
FIG. 13 illustrates an exemplary embodiment for an application running on the processor of FIG. 12.

Referring to FIGS. 11 to 13, a system for querying data sources will now be described. In FIG. 11, there is illustrated a data query system 1002. The data query system 1002 may be accessible remotely from any one of a plurality of devices 1010 over connections 1008. The devices 1010 may comprise any device, such as a personal computer, a tablet, a smart phone, or the like, which is configured to communicate over the connections 1008. In some embodiments, the data query system 1002 may itself be provided directly on one of the devices 1010, either as a downloaded software application, a firmware application, or a combination thereof.

One or more data sources 101 may be integrated directly into the data query system 1002 or any one of the devices 1010, or may be provided separately therefrom (as illustrated). In the case of a remote access to the data sources 101, access may occur via connections 1008. The connections 1008 may take various forms, for example wire-based technology such as electrical wires or cables, and/or optical fibers. The connections 1008 may also be wireless, such as RF, infrared, Wi-Fi, Bluetooth, and others. Connections 1008 may therefore comprise a network, such as the Internet, the Public Switch Telephone Network (PSTN), a cellular network, or others known to those skilled in the art. Communication over the network may occur using any known communication protocols that enable devices within a computer network to exchange information. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

The various data sources 101 described herein may be provided as collections of data or information organized for rapid search and retrieval by a computer. The data sources 101 may be structured to facilitate storage, retrieval, modification, and deletion of data in conjunction with various data-processing operations. The data sources 101 may be any organization of data on a data storage medium, such as one or more servers.

As shown in FIG. 12, the data query system 1002 illustratively comprises one or more server(s) 1100. For example, a series of servers corresponding to a web server, an application server, and a database server may be used. These servers are all represented by server 1100 in FIG. 12. The server 1100 may be accessed by a user using one of the devices 1010, or directly on the system 1002 via the graphical user interface 201. The server 1100 may comprise, amongst other things, a plurality of applications 1106a . . . 1106n running on a processor 1104 coupled to a memory 1102. It should be understood that while the applications 1106a . . . 1106n presented herein are illustrated and described as separate entities, they may be combined or separated in a variety of ways.

The memory 1102 accessible by the processor 1104 may receive and store data. The memory 1102 may be a main memory, such as a high speed Random Access Memory (RAM), or an auxiliary storage unit, such as a hard disk, a floppy disk, or a magnetic tape drive. The memory 1102 may be any other type of memory, such as a Read-Only Memory (ROM), or optical storage media such as a videodisc and a compact disc. The processor 1104 may access the memory 1102 to retrieve data. The processor 1104 may be any device that can perform operations on data. Examples are a central processing unit (CPU), a front-end processor, a microprocessor, and a network processor. The applications 1106a . . . 1106n are coupled to the processor 1104 and configured to perform various tasks. An output may be transmitted to the devices 1010 or displayed directly on the GUI 201. The memory 1102 illustratively comprises predefined operations and associated attributes. The memory may also comprise saved query statements and/or saved query results.

FIG. 13 is an exemplary embodiment of an application 1106a running on the processor 1104. The application 1106a illustratively comprises a query statement module 1202 and a query result module 1204. The query statement module 1202 may be configured to receive a query request. Parameters for the query request may be provided within the query request or separately therefrom, as explained above. The query statement module is configured to generate a query statement comprising at least one data source, at least one target field, query parameters, and a plurality of nested operations having associated attributes. The query statement module 1202 is also configured to execute the query statement by accessing data sources, retrieving data from one or more fields in the data sources, and transforming retrieved data into target results using the nested operations. Transformed data is provided to the query result module 1204, which is configured to generate a query result by populating the target fields with target results.

Application 1106a or another application, such as application 1106b, may be configured to determine, upon receipt of another query request, if a previously stored query result may be used. Application 1106a, 1106b, or another application may be configured to determine if a change has occurred to one or more sources in a chain of data sources, to regenerate query results that are affected by the source change, and to delete previously stored query results that correspond to the regenerated query results. Application 1106a, 1106b, or another application may be configured to determine if a change in some parameters between a previous query statement and a newly received query statement may allow some query results in a chain of query results to be reused while other query results need to be regenerated. Regenerated query results for changed parameters may be stored in addition to the initial query results.

Note that data sources may be identified in various ways, such as by identifying a location or another query statement by name, identifying a type or format, providing a header for a type of file format to define sources fields, or other ways. Target fields may also be defined in various ways, such as using text values to determine an output layer. Information such as the name of a field, the order of a field, whether the field is visible or not in the final result, and if the field is used to sort the final result may be provided. With regards to global parameters to be used by all query statements, they may identify values passed at the same time a final query statement is called. They may be set as default values in the setup process. They may also be used as source paths, for target field setup, or to filter data.

The above description is meant to be exemplary only, and one skilled in the relevant arts will recognize that changes may be made to the embodiments described without departing from the scope of the invention disclosed. While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and non-transitory computer readable mediums disclosed and shown herein may comprise a specific number of elements/components, the systems, methods and non-transitory computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method for querying data from data sources, the method comprising:
   (a) receiving a first query request;
   (b) generating a first query statement corresponding to the first query request, the first query statement identifying:
      (i) at least one first data source comprising a second query statement:
      (ii) at least one first target field;
      (iii) first query parameters; and
      (iv) a plurality of nested operations having associated attributes;
   (c) executing the first query statement by:
      (v) accessing the at least one first data source using the first query parameters;
      (vi) retrieving data from a given field in the at least one first data source in accordance with at least one of the nested operations; and
      (vii) transforming retrieved data into at least one target result in accordance with remaining ones of the nested operations; and
   (d) generating a first query result by populating the at least one target field with the at least one target result, wherein executing the first query statement comprises executing the second query statement and generating a second query result, and wherein retrieving data from the given field comprises retrieving data from the given field of the second query result;
   (e) receiving a third query request identifying at least one third data source, defining at least one third target field, and comprising third query parameters;
   (f) determining if the at least one third data source, the at least one third target field, and the third query parameters match the at least one first data source, the at least one first target field, and the first query parameters, respectively;

(g) in case of no match, generating a third query statement in accordance with the third query request and executing the third query statement to return a third query result;

(h) in case of a match, retrieving the first query result and returning the first query result as the third query result;

(e) receiving a third query request identifying at least one third data source, defining at least one third target field, and comprising third query parameters;

(f) determining if the at least one third data source, the at least one third target field, and the third query parameters match the at least one first data source, the at least one first target field, and the first query parameters, respectively;

(g) in case of no match, generating a third query statement in accordance with the third query request and executing the third query statement to return a third query result;

(h) in case of a match, retrieving the first query result and returning the first query result as the third query result:

(viii) in case of no change, retrieving the first query result and returning the first query result as the third query result is performed; and (ix) in case of a change, deleting the first query result, retrieving the first query statement, and executing the first query statement to return the third query result, deleting all query results associated with query statements in a chain of query statements that refer to the changed data source, regenerating query results for the query statements in the chain of query statements that refer to the changed data source, and retrieving stored query results for query statements that are not part of the chain of query statements that refer to the changed data source.

2. The method of claim 1, wherein the at least one first data source comprises at least one chain of query statements that each refer to another query statement until a final data source is referred to for each chain of query statements, and wherein executing the first query statement comprises executing all of the query statements in the chain and generating corresponding query results.

3. The method of claim 1, further comprising saving at least one of query statements and query results for reuse.

4. The method of claim 1, further comprising, in case of no match or a change in at least one parameter between the first query parameters and the third query parameters, regenerating query results for the query statements in the chain of query statements that use or result from the use of the changed at least one parameter, and retrieving stored query results for query statements that are not part of the chain of query statements that use or result from the use of the changed at least one parameter.

5. The method of claim 1, wherein generating the first query statement comprises using recursive data transformation steps to define the steps of (v) accessing, (vi) retrieving, and (vii) transforming, in order to obtain the at least one target result.

6. The method of claim 5, wherein generating the first query result further comprises displaying returned values for each one of the recursive data transformation steps.

7. The method of claim 5, wherein executing the first query statement further comprises filtering at least one of retrieved data and transformed data.

8. The method of claim 7, wherein filtering comprises automatically determining whether the filtering is applied to the retrieved data or the transformed data.

9. The method of claim 5, wherein generating the first query statement comprises defining an initial step of the recursive data transformation steps as a join function in order to join at least two data sources together, and defining the at least one first target field as at least one join target field.

10. The method of claim 9, wherein the join function uses fields from any one of the at least one first data source, ad hoc parameters, and hardcoded values.

11. The method of claim 9, wherein executing the first query statement comprises automatically determining an index of rows from the at least two data sources to match the at least one join target field.

12. The method of claim 11, wherein transforming retrieved data comprises using the index of rows for any non-join target fields.

13. The method of claim 5, wherein executing the first query statement further comprises applying a first grouping function to the at least one target result, and populating the at least one target field comprises using only fields from the first grouping function.

14. The method of claim 5, wherein executing the first query statement further comprises applying a second grouping function to the at least one first data source, and retrieving data comprises retrieving only from fields from the second grouping function.

15. A system for querying data from data sources, the system comprising:

a processing unit; and a memory, communicatively coupled to the processing unit and comprising computer-readable program instructions, the program instructions executable by the processing unit for:

(a) receiving a first query request;

(b) generating a first query statement corresponding to the first query request, the first query statement identifying:

(i) at least one first data source comprising a second query statement:

(ii) at least one first target field;

(iii) first query parameters; and (iv) a plurality of nested operations having associated attributes;

(c) executing the first query statement by:

(v) accessing the at least one first data source using the first query parameters;

(vi) retrieving data from a given field in the at least one first data source in accordance with at least one of the nested operations; and (vii) transforming retrieved data into at least one target result in accordance with remaining ones of the nested operations; and (d) generating a first query result by populating the at least one target field with the at least one target result, wherein executing the first query statement comprises executing the second query statement and generating a second query result, and wherein retrieving data from the given field comprises retrieving data from the given field of the second query result;

(e) receiving a third query request identifying at least one third data source, defining at least one third target field, and comprising third query parameters;

(f) determining if the at least one third data source, the at least one third target field, and the third query parameters match the at least one first data source, the at least one first target field, and the first query parameters, respectively;

(g) in case of no match, generating a third query statement in accordance with the third query request and executing the third query statement to return a third query result;

(h) in case of a match, retrieving the first query result and returning the first query result as the third query result;

(viii) in case of no change, retrieving the first query result and returning the first query result as the third query result is performed; and (ix) in case of a change, deleting the first query result, retrieving the first query statement, and executing the first query statement to return the third query result, deleting all query results associated with query statements in a chain of query statements that refer to the changed data source, regenerating query results for the query statements in the chain of query statements that refer to the changed data source, and retrieving stored query results for query statements that are not part of the chain of query statements that refer to the changed data source.

16. The system of claim 15, wherein the at least one first data source comprises at least one chain of query statements that each refer to another query statement until a final data source is referred to for each chain of query statements, and wherein executing the first query statement comprises executing all of the query statements in the chain and generating corresponding query results.

17. The system of claim 15, further comprising saving at least one of query statements and query results for reuse.

18. The system of claim 15, further comprising, in case of no match or a change in at least one parameter between the first query parameters and the third query parameters, regenerating query results for the query statements in the chain of query statements that use or result from the use of the changed at least one parameter, and retrieving stored query results for query statements that are not part of the chain of query statements that use or result from the use of the changed at least one parameter.

19. The system of claim 15, wherein generating the first query statement comprises using recursive data transformation steps to define the steps of (v) accessing, (vi) retrieving, and (vii) transforming, in order to obtain the at least one target result.

20. The system of claim 19, wherein generating the first query result further comprises displaying returned values for each one of the recursive data transformation steps.

21. The system of claim 19, wherein executing the first query statement further comprises filtering at least one of retrieved data and transformed data.

22. The system of claim 21, wherein filtering comprises automatically determining whether the filtering is applied to the retrieved data or the transformed data.

23. The system of claim 19, wherein generating the first query statement comprises defining an initial step of the recursive data transformation steps as a join function in order to join at least two data sources together, and defining the at least one first target field as at least one join target field.

24. The system of claim 23, wherein the join function uses fields from any one of the at least one first data source, ad hoc parameters, and hardcoded values.

25. The system of claim 23, wherein executing the first query statement comprises automatically determining an index of rows from the at least two data sources to match the at least one join target field.

26. The system of claim 25, wherein transforming retrieved data comprises using the index of rows for any non-join target fields.

27. The system of claim 19, wherein executing the first query statement further comprises applying a first grouping function to the at least one target result, and populating the at least one target field comprises using only fields from the first grouping function.

28. The system of claim 19, wherein executing the first query statement further comprises applying a second grouping function to the at least one first data source, and retrieving data comprises retrieving only from fields from the second grouping function.

* * * * *